US008385385B2

(12) United States Patent
Michaels et al.

(10) Patent No.: US 8,385,385 B2
(45) Date of Patent: Feb. 26, 2013

(54) PERMISSION-BASED SECURE MULTIPLE ACCESS COMMUNICATION SYSTEMS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 873 days.

(21) Appl. No.: 12/496,233

(22) Filed: Jul. 1, 2009

(65) Prior Publication Data

US 2011/0002360 A1  Jan. 6, 2011

(51) Int. Cl.
*H04B 1/00* (2006.01)
(52) U.S. Cl. ........................................... 375/141
(58) Field of Classification Search .................. 375/132, 375/135, 141, 146, 143, 265, 300, 302, 324, 375/343
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Aparicio; "Communications Systems Based on Chaos" May 2007. Universidad Rey Juan Carlos.

(Continued)

*Primary Examiner* — David C. Payne
*Assistant Examiner* — Syed Haider
(74) *Attorney, Agent, or Firm* — Fox Rothschild, LLP; Robert J. Sacco

(57) ABSTRACT

Systems (100) and methods for selectively controlling access to multiple data streams which are communicated using a shared frequency spectrum and spreading code. The methods involve forming a global data communication signal (134) by amplitude modulating a global data signal (130) comprising global data symbols and forming a phase modulated signal (120) by phase modulating a protected data signal. The phase modulated signal represents protected data symbols. The methods also involve forming a protected data communication signal (126) by changing phase angles of the protected data symbols using a variable angle Ø determined by a random number source and combining the protected data signal with a spreading sequence (CSC). The methods further involve combining the global and protected data communication signals to form an output communication signal (140) having a spread spectrum format. The output communication signal is transmitted over a communications channel (104).

28 Claims, 8 Drawing Sheets

U.S. PATENT DOCUMENTS

| | | | |
|---|---|---|---|
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 5,963,584 A * | 10/1999 | Boulanger et al. ............ 375/141 |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0094797 A1 | 7/2002 | Marshall et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001534 A1* | 1/2004 | Yang ............................ 375/143 |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1* | 5/2004 | Hartson et al. ................ 348/608 |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165681 A1 | 8/2004 | Mohan |
| 2004/0184416 A1 | 9/2004 | Woo |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0239334 A1 | 10/2006 | Kwon et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1* | 8/2007 | Ahmed ........................ 375/135 |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0026706 A1* | 1/2008 | Shimizu et al. ................ 455/108 |
| 2008/0075195 A1 | 3/2008 | Pajukoski et al. |
| 2008/0080439 A1 | 4/2008 | Aziz et al. |
| 2008/0084919 A1* | 4/2008 | Kleveland et al. ............. 375/146 |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 | 1/2009 | Ito et al. |
| 2009/0034727 A1 | 2/2009 | Chester et al. |

| | | | |
|---|---|---|---|
| 2009/0044080 | A1 | 2/2009 | Michaels et al. |
| 2009/0059882 | A1 | 3/2009 | Hwang et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0029225 | A1* | 2/2010 | Urushihara et al. .......... 455/110 |
| 2010/0030832 | A1 | 2/2010 | Mellott |
| 2010/0054225 | A1 | 3/2010 | Hadef et al. |
| 2010/0073210 | A1 | 3/2010 | Bardsley et al. |
| 2010/0111296 | A1 | 5/2010 | Brown et al. |
| 2010/0142593 | A1 | 6/2010 | Schmid |
| 2010/0254430 | A1 | 10/2010 | Lee et al. |
| 2010/0260276 | A1 | 10/2010 | Orlik et al. |
| 2011/0222393 | A1 | 9/2011 | Kwak et al. |

FOREIGN PATENT DOCUMENTS

| | | |
|---|---|---|
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Bererber, S.M., et al., "Design of a CDMA System in FPGA Technology", Vehicular Technology Conference, 2007. VTC2007-Spring. IEEE 65th Apr. 22-25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld-AWolfram Web Resource [online] [retrieved on Nov. 8, 2010] Retrieved from the Internet: <http://mathworld.wolfram.com/surjection.html>.

Weisstein, E., Surejection:, From MathWorld-AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Abel, et al., "Chaos Communications-Principles, Schemes, and System Analysis" Proceedings for the IEEE. New York, NY. vol. 90, No. 5, May 1, 2002, XP011064997, ISSN: 0018-9219.

Barile, Margherita, "Bijective," From MathWorld-A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] vol. 69, No. 2, Feb. 1, 2004, pp. 26201-26201, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-48; p. 50-51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld-A Wolfram Web Resource. http://mathworld.wolfram.com/Injection.html.

Weisstein, Eric W. "Surjection," From MathWorld-A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems, New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Taylor, F.J., "Residue Arithmetic a Tutorial with Examples", Computer, vol. 17, No. 5, pp. 50-62, May 1984, doi: 10.1109/MC. 1984. 1659138.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-85, p. 238-242.

Schneier, Bruce: "Applied Cryptography Second Edition", 1997, John Wiley & Sons, USA, XP002636792, p. 254-255.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Japanese Office Action dated Aug. 29, 2012, Application Serial No. 2011-531166 in the name of Harris Corporation.

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

* cited by examiner

PERMISSION-BASED SECURE MULTIPLE ACCESS COMMUNICATION SYSTEMS

BACKGROUND OF THE INVENTION

1. Statement of the Technical Field

The invention concerns communications systems. More particularly, the invention concerns communications systems employing chaos-based multiple access methods.

2. Description of the Related Art

Pseudorandom number generators (PRNG) generally utilize digital logic or a digital computer and one or more algorithms to generate a sequence of numbers. While the output of conventional PRNG may approximate some of the properties of random numbers, they are not truly random. For example, the output of a PRNG has cyclostationary features that can be identified by analytical processes.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences digitally requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput, error rate performance, and exploitability. In this context, the phrase "non-coherent waveform" means that the receiver is not required to reproduce a synchronized copy of the chaotic signals that have been generated in the transmitter. The phrase "communications using a coherent waveform" means that the receiver is required to reproduce a synchronized copy of the chaotic signals that have been generated in the transmitter.

A second common alternative to constructing a secure waveform is the use of direct sequence spread spectrum (DSSS) techniques. DSSS techniques are commonly used for multiple access communication systems since the spreading codes are reasonably orthogonal, allowing multiple users to communicate simultaneously in a shared frequency spectrum. Two examples of communication systems that employ DSSS techniques are code division multiple access (CDMA) communications as used in cellular telephony and Global Positioning Satellite (GPS) ranging waveforms. DSSS techniques are limited however in their LPI/LPD characteristics and security due to a square wave spreading sequence that can be easily exploited to gain at least partial information of the communication signal. DSSS technique are also limited in their ability to distinguish between two intended users or user groups based on user permissions, thereby requiring higher layer network protocol functions or multiple signals to separate data between users.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput. Further still, there is a need for a chaos-based permission-controlled multiple access communication system that permits multiple users to communicate simultaneously, while retaining the inherent LPI/LPD features of the chaotic waveform and segregating access data to communicated data between users or user groups based on user permissions.

SUMMARY OF THE INVENTION

The present invention concerns communication systems and methods for selectively controlling access to multiple data streams which are communicated using a shared frequency spectrum and shared spreading codes. The methods involve forming a global data communication signal by amplitude modulating a global data signal comprising global data symbols. The methods also involve forming a phase modulated signal by phase modulating a data signal including protected data symbols. The methods further involve forming a protected data communication signal by changing phase angles of the protected data symbols by a variable angle Ø and combining the phase modulated signal with a spreading sequence. The spreading sequence can be a pseudorandom number sequence or a digitally generated chaotic spreading sequence. The global data communication signal is combined with the protected data communication signal to form an output communication signal having a spread spectrum format. The output communication signal is transmitted over a communications channel.

According to an aspect of the invention, the methods involve generating a random number sequence. This random number sequence can be a pseudorandom number sequence or a digitally generated chaotic sequence. In such a scenario, a random number of the random number sequence is used to select the variable angle Ø. Different random numbers can be used to select the variable angle Ø for changing the phase angles of the first data symbols. At least one random number of the random number sequence can be used for changing a phase angle of at least one first data symbol of the first data symbols.

According to another aspect of the invention, the output communication signal is received at a partial permission receiver. At the partial permission receiver a de-spreading sequence is generated. The de-spreading sequence is identical to the spreading sequence used to construct the output communication signal. The de-spreading sequence is also synchronized in time and frequency with the spreading sequence. Thereafter, the output communication signal is correlated with the de-spreading sequence to form a correlated signal. An amplitude demodulation is performed using the correlated signal to recover the global data symbols. Notably, the partial permission receiver does not have the ability to disambiguate the variable phase angle Ø, thus can only detect a symbol-by-symbol correlation peak at an arbitrary angle.

According to one embodiment, the transmitter may periodically transmit a known phase angle symbol, a sequence of known symbols, or a sequence of symbols drawn from a proper subset of valid random phase angles, in order to maintain phase tracking loop lock at the partial permission receiver. Alternately, a separate signal may contain phase tracking information from the transmitter, eliminating the need for any additional synchronization information. Any such synchronization method can be used without loss of generality.

According to another aspect of the invention, the output communication signal is received at a full permission receiver. At the full permission receiver, a de-spreading sequence is generated. The de-spreading sequence is identical to the spreading sequence used to construct the output communication signal. The de-spreading sequence is synchronized in time and frequency with the spreading sequence. Thereafter, the output communication signal is correlated with the de-spreading sequence to obtain a correlated signal comprising a plurality of data symbols. The phase angles of the data symbols are changed using the variable angle Ø to form a phase de-rotated signal. A phase demodulation can be performed using the phase de-rotated signal to obtain the protected data symbols. Similarly, an amplitude demodulation can be performed using the phase de-rotated signal to obtain the global data symbols. It should be noted that the correlation process need not be performed prior to the phase de-rotation process. For example, a de-rotated signal can be correlated with the de-spreading sequence to obtain a correlated signal. In such a scenario, the phase demodulation is performed using the correlated signal to obtain the protected data.

The communication systems generally implement the above described method. As such, the communications systems generally comprise an amplitude modulator, a phase modulator, a phase rotating and signal combining (PRSC) device, a second combiner, a spreading sequence generator, and a transceiver. The amplitude modulator is configured for forming a global data communication signal by amplitude modulating a global data signal comprising global data symbols. The phase modulator is configured for forming a phase modulated signal by phase modulating a data signal including protected data symbols. The phase rotating and signal combining (PRSC) device is configured for forming a protected data communication signal by changing phase angles of the first data symbols using a variable angle Ø and combining the phase modulated signal with a spreading sequence. The spreading sequence may be generated using a pseudorandom number generator or a digital chaotic sequence generator. The second combiner is configured for combining the global data communication signal and the protected data communication signal to form an output communication signal having a spread spectrum format. The transceiver is configured for transmitting the output communication signal over a communications channel.

The communication systems can also be comprised of a plurality of partial permission receivers and full permission receivers. The partial permission receiver is configured for receiving the output communication signal. The partial permission receiver is also configured for generating a de-spreading sequence which is identical to the spreading sequence. The partial permission receiver is further configured for correlating the output communication signal with the de-spreading sequence to form a correlated signal. An amplitude demodulation is performed using the correlated signal to recover the global data symbols.

The full permission receiver is configured for receiving the output communication signal and generating a de-spreading sequence which is identical to the spreading sequence. The full permission receiver is also configured for correlating the output communication signal with the de-spreading sequence to obtain a correlated signal comprising a plurality of data symbols. The full permission receiver is further configured for changing phase angles of the data symbols using a variable angle based on a pseudorandom number generator to form a phase de-rotated signal. A phase demodulation can be performed using the phase de-rotated signal to obtain the protected data. Similarly, an amplitude demodulation can be performed using the phase de-rotated signal to obtain the global data symbols.

BRIEF DESCRIPTION OF THE DRAWINGS

Embodiments will be described with reference to the following drawing figures, in which like numerals represent like items throughout the figures, and in which.

DETAILED DESCRIPTION

Embodiments of the present invention will now be described with respect to FIGS. 1-8. Embodiments of the present invention relate to multiple access based communications systems. Multiple access based communications systems according to embodiments of the present invention generally allow signals including data intended for multiple users to be transmitted from a source at the same time over the same frequency band using the same spreading codes. The signal transmissions are accomplished using different modulation processes to form a global data communication signal and a protected data communication signal. For example, a global data communication signal is generally formed by amplitude modulating a signal including global data. A protected data communications signal is generally formed by: (a) phase modulating a signal including protected data symbols to form a phase modulated signal; and (b) rotating phase angles of data symbols of the phase modulated signal by certain amounts. The multiple access based communications systems also allow transmitted signals to be received at one or more receivers implementing unique user access permissions. At the receivers, the appropriate demodulation process is used to recover the data intended for a particular user. In effect, the permission-based multiple access communications systems allow users with certain keys to recover protected data (e.g., data targeted to specific users) and/or global data (e.g., data targeted to all authorized users) from the same transmitted signal(s).

Before describing the communications systems of the present invention, it will be helpful in understanding an exemplary environment in which the invention can be utilized. In this regard, it should be understood that the communications systems of the present invention can be utilized in a variety of different applications where access to certain types of data is selectively controlled. The use of unique configurations of the same spreading codes can be coupled with the use of multiple spreading codes to expand the number of unique access permissions. Such applications include, but are not limited to, military applications and commercial mobile/cellular telephone applications.

Multiple Access Communication System Architectures

Figure 1:
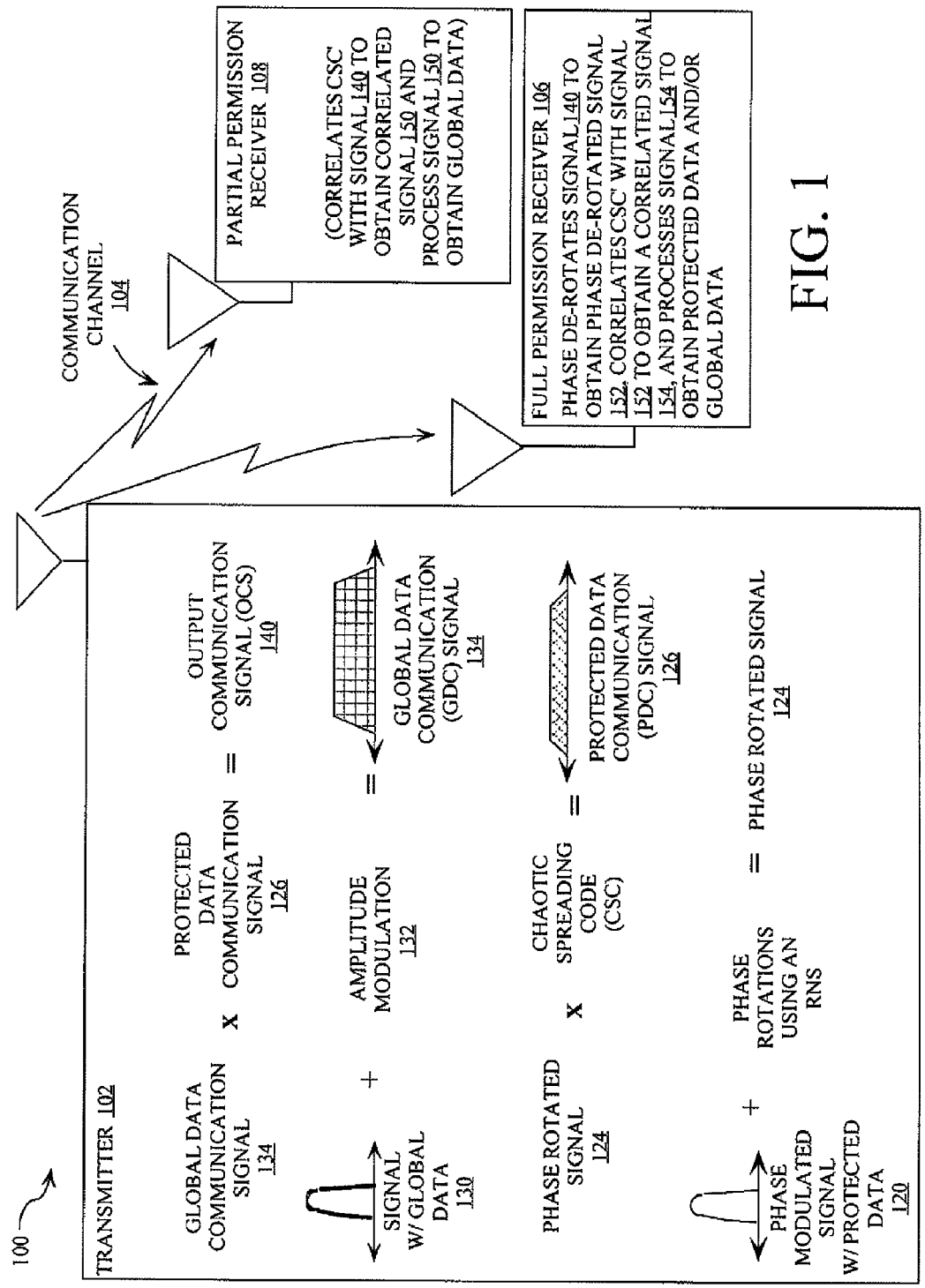
FIG. 1 is a schematic illustration of an exemplary multiple access communication system according to an embodiment of the invention.

Referring now to FIG. 1, there is provided a schematic illustration of an exemplary permission based multiple access communication system (PBMACS) 100 according to an embodiment of the invention. As shown in FIG. 1, PBMACS 100 is comprised of a transmitter 102 and receivers 106, 108. Transmitter 102 is generally configured to generate an output communication signal (OCS) 140 having chaotic properties. OCS 140 can include protected data (e.g., data targeted to specific users) and/or global data (e.g., data targeted to all authorized users). OCS 140 is generated using a coherent chaotic sequence spread spectrum (CCSSS) method.

The CCSSS method generally involves forming a phase rotated signal 124 by rotating phase angles of protected data symbols (e.g., M-ary phase shift keying symbols) of a phase modulated signal 120. The phase modulated signal 120 is formed by phase modulating a signal with protected data. Techniques for phase modulating a signal are well known to those having ordinary skill in the art, and therefore will not be described herein. However, it should be understood that the phase modulated signal 120 can be generated in accordance with any known discrete time phase modulation scheme. Such discrete time phase modulation schemes include, but are not limited to, phase-shift keying (PSK).

According to an embodiment of the invention, the phase rotated signal 124 is formed by combining the phase modulated signal 120 with a phase rotating code (PRC). The PRC rotates the phase angles of the data symbols of signal 120 by a selected random phase, said random phase selection occurring at the same rate as the protected data symbols. The amount of phase angle rotations can be defined by the following mathematical expression [RN_1, RN_2, ..., RN_W], where RN_1, RN_2, ..., RN_W are random numbers of a random number sequence. Random number sequences are well known to those having ordinary skill in the art, and therefore will not be described herein. However, it should be understood that the random number sequence may be generated with a pseudorandom number generator, a digital chaotic sequence generator, and/or any other similarly constructed random number source. If the data symbols PSK_1, PSK_2, ..., PSK_W of signal 120 have respective phase angles $\varnothing_{PSK\_1}, \varnothing_{PSK\_2}, \ldots, \varnothing_{PSK\_W}$, then the data symbols of the phase rotated signal 124 have phase angles $\varnothing_{PSK\_1}$+RN_1, $\varnothing_{PSK\_2}$+RN_2, ..., $\varnothing_{PSK\_W}$+RN_W modulo $2\pi$, where all angles are stated in radian angles. The invention is not limited in this regard. For example, the phase angles $\varnothing_{PSK\_1}, \varnothing_{PSK\_2}, \ldots, \varnothing_{PSK\_W}$ of signal 120 can be rotated by any mathematical function of one or more random numbers of the random number sequence. In this regard, it should be understood that the present invention will be described in accordance with the first scenario (i.e., in which the phase angles are changed by a single random number) for purposes of clarity and simplicity.

The CCSSS method also involves forming a protected data communications signal 126 by combining data symbols (e.g., M-ary phase shift keying symbols) of the phase rotated signal 124 with a chaotic spreading code CSC. The CSC spreads the spectrum of the data symbols according to a spreading ratio. The protected data communications signal 126 resembles a truly random signal. The CCSSS method further involves forming an output communication signal 140 by combining the protected data communications signal 126 with a global data communications signal 134. The global data communications signal 134 is formed by amplitude modulating a signal 130 with global data symbols. Techniques for amplitude modulating a signal are well known to those having ordinary skill in the art, and therefore will not be described herein. However, it should be understood that the global communication signal 134 can be generated in accordance with any known discrete time amplitude modulation scheme. Such discrete time amplitude modulation schemes include, but are not limited to, pulse amplitude modulation (PAM) and quadrature amplitude modulation (QAM).

Referring again to FIG. 1, transmitter 102 is also configured to transmit the output communication signal 140 to receivers 106, 108. OCS 140 can be transmitted from the transmitter 102 over the communications channel 104. An embodiment of transmitter 102 will be described below in relation to FIG. 2.

Receiver 106 is generally configured for receiving signals transmitted from transmitter 102. Receiver 106 is a full permission receiver configured to access the protected data and the global data. Receiver 106 is also generally configured for removing the randomness of the received signals to recover the phase rotated protected data. In particular, the data is recovered by: (a) forming a phase de-rotated signal 152 by phase de-rotating OCS 140; (b) correlating the phase de-rotated signal 152 with a de-spreading code to form a correlated signal 154; (c) performing a phase demodulation process using the correlated signal 154 to obtain the protected data; and/or (d) performing an amplitude demodulation process using the correlated signal 154 to obtain the global data. The de-spreading code CSC' is a replica of the orthogonal chaotic spreading code CSC. The replica chaotic de-spreading code is synchronized in time and frequency with the orthogonal chaotic spreading code CSC. Phase demodulation processes are well known to those having ordinary skill in the art, and therefore will not be described herein. Similarly, amplitude demodulation processes are well known to those having ordinary skill in the art, and therefore will not be described herein. Any known phase demodulation process and amplitude demodulation process can be used without limitation. An embodiment of receiver 106 will be described below in relation to FIG. 4.

Receiver 108 is generally configured for receiving signals transmitted from the transmitter 102. Receiver 108 is a partial permission receiver configured to only access global data. In particular, the global data is recovered by: (a) correlating OCS 140 with a de-spreading code to form a correlated signal 150; and (b) performing an amplitude demodulation process using the correlated signal 150 to obtain the global data. The de-spreading code CSC' is a replica of the orthogonal chaotic spreading code CSC. The replica chaotic spreading code is synchronized in time and frequency with the orthogonal chaotic spreading code CSC. An embodiment of receiver 108 will be described below in relation to FIG. 5.

Transmitter Architectures

Figure 2:
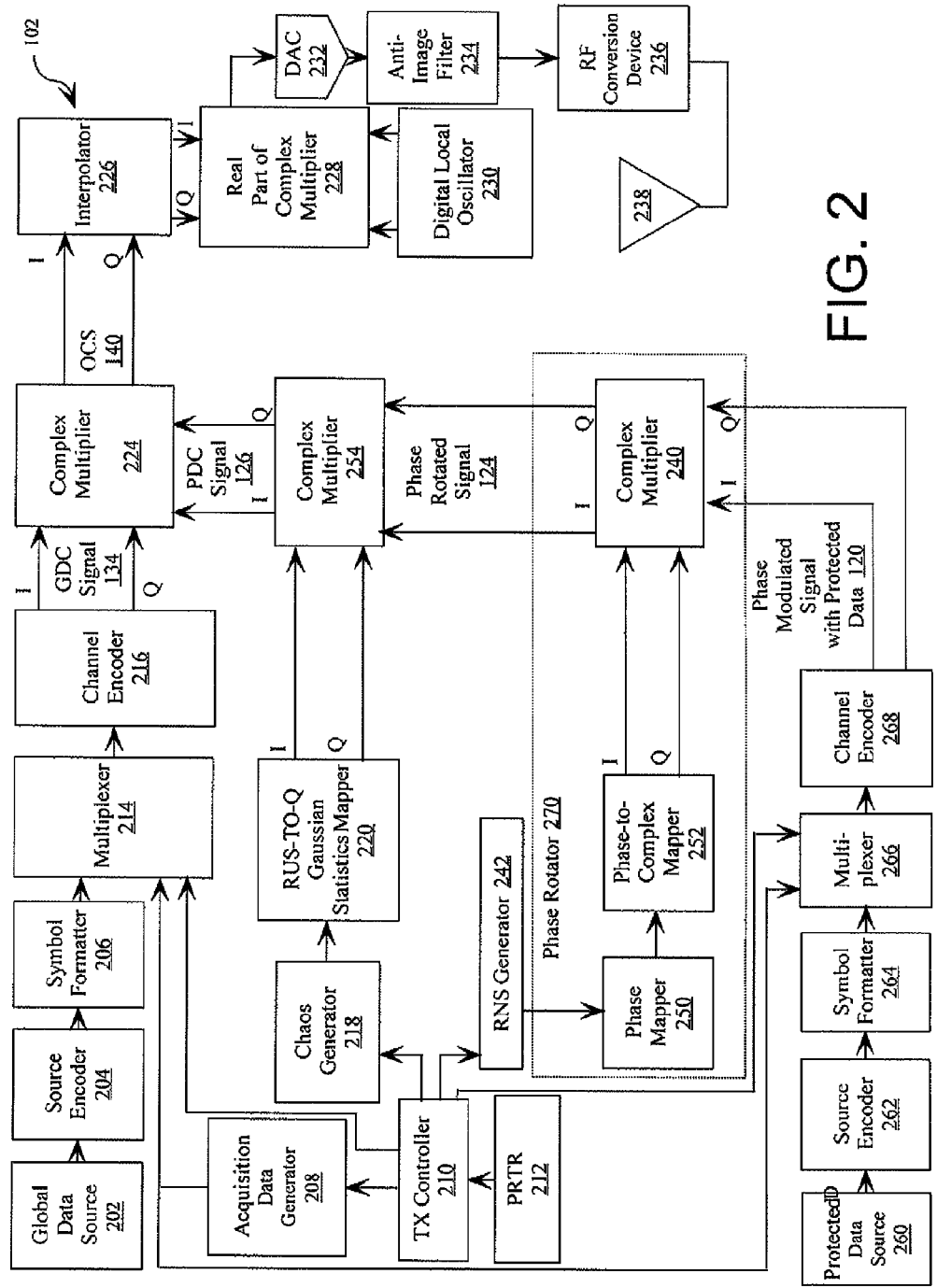
FIG. 2 is a more detailed block diagram of the transmitter shown in FIG. 1 according to an embodiment of the present invention.

Referring now to FIG. 2, there is provided a block diagram of the transmitter 102 shown in FIG. 1. The embodiment of the transmitter 102 assumes that: (1) a low order phase shift keying (PSK) protected data modulation is used; (2) a low order pulse amplitude modulation (PAM) global data modulation is used; (3) no pulse shaping is applied to data symbols; and (4) chaotic spectral spreading is performed at an intermediate frequency (IF).

Referring again to FIG. 2, transmitter 102 is generally configured for generating quadrature amplitude-and-time-discrete baseband signals. Transmitter 102 is also configured for spreading the amplitude-and-time-discrete baseband signals over a wide intermediate frequency band. This spreading consists of multiplying the amplitude-and-time-discrete baseband signals by quadrature digital chaotic sequences. The products of these arithmetic operations are hereinafter referred to as digital chaotic signals. In this regard, it should be understood that transmitter 102 is also configured to process the digital chaotic signals to place the same in a proper analog form suitable for transmission over a communications link. Transmitter 102 is further configured to communicate analog chaotic signals to receivers 106, 108 (described above in relation to FIG. 1) via a communications channel 104 (described above in relation to FIG. 1).

As shown in FIG. 2, transmitter 102 is comprised of data sources 202, 260, source encoders 204, 262, symbol formatters 206, 264, multiplexers 214, 266, and channel encoders 216, 268. Transmitter 102 is also comprised of an acquisition data generator 208, a transmitter controller 210, a precision real time reference 212, complex multipliers 224, 254, random number sequence generator 242, a phase rotator 270, a chaos generator 218, and a real uniform statistics to quadrature (RUS-to-Q) Gaussian statistics mapper (RUQGs) 220. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238.

Data source 202 is a global data source. Data source 202 is generally an interface configured for receiving an input signal containing global data from an external device (not shown). As such, data source 202 can be configured for receiving bits of data from the external data source (not shown). Data source 202 can further be configured for supplying bits of data to source encoder 204 at a particular data transfer rate.

Source encoder 204 is generally configured to encode the global data received from the external device (not shown) using a forward error correction coding scheme. The bits of global data received at or generated by source encoder 204 represent any type of information that may be of interest to a user. For example, the global data can be used to represent text, telemetry, audio, or video data. Source encoder 204 can further be configured to supply bits of global data to symbol formatter 206 at a particular data transfer rate.

Symbol formatter 206 is generally configured to process bits of global data for forming channel encoded symbols. In a preferred embodiment, the source encoded symbols are formatted into parallel words compatible with pulse amplitude modulation (PAM) encoding. Symbol formatter 206 can further be configured for communicating the formatted data to the multiplexer 214.

According to an embodiment of the invention, symbol formatter 206 is functionally similar to a serial in/parallel out shift register where the number of parallel bits out is equal to log base two ($\log_2$) of the order of channel encoder 216. According to an embodiment of the invention, symbol formatter 206 is selected for use with a four-level PAM modulator. As such, symbol formatter 206 is configured for performing a PAM formatting function for grouping two (2) bits of global data together to form a PAM symbol data word (i.e., a single two bit parallel word). Thereafter, symbol formatter 206 communicates the formatted symbol data word to the multiplexer 214. Still, embodiments of the present invention are not limited in this regard.

According to another embodiment of the invention, symbol formatter 206 is selected for use with a sixteen quadrature amplitude modulation (16QAM) modulator. As such, symbol formatter 206 is configured for mapping four (4) bits to a 16QAM symbol data word. Thereafter, symbol formatter 206 communicates the 16QAM symbol word to the multiplexer 214. Still, embodiments of the present invention are not limited in this regard.

Referring again to FIG. 2, acquisition data generator 208 is configured for generating a "known data preamble". The "known data preamble" can be a repetition of the same known symbol or a series of known symbols. The "known data preamble" can be used to enable initial synchronization of chaotic sequences generated in transmitter 102 and receivers 106, 108 (described above in relation to FIG. 1). The duration of the "known data preamble" is determined by an amount required by a receiver 106, 108 (described above in relation to FIG. 1) to synchronize with transmitter 102 under known worst case channel conditions. The acquisition data generator 208 can be further configured for communicating the "known data preamble" to at least one of the multiplexers 214, 266.

Multiplexer 214 is configured to receive a binary word (that is to be modulated by the channel encoder 216) from the symbol formatter 206. Multiplexer 214 is also configured to receive the "known data preamble" from the acquisition data generator 208. Multiplexer 214 is coupled to transmitter controller 210. Transmitter controller 210 is configured for controlling multiplexer 214 so that multiplexer 214 routes the "known data preamble" to channel encoder 216 at the time of a new transmission.

According to alternative embodiments of the invention, the "known data preamble" is stored in a modulated form. In such a scenario, the architecture of FIG. 2 is modified such that multiplexer 214 exists after channel encoder 216. The "known data preamble" may also be injected at known intervals to aid in periodic resynchronization of chaotic sequences generated in transmitter 102 and receiver 106, 108 (described above in relation to FIG. 1). This would typically be the case for an implementation meant to operate in harsh channel conditions. Still, the invention is not limited in this regard.

Referring again to FIG. 2, multiplexer 214 can be configured for selecting symbol data to be routed to channel encoder 216 after a preamble period has expired. Multiplexer 214 can also be configured for communicating data symbols to channel encoder 216. In this regard, it should be appreciated that a communication of the symbol data to channel encoder 216 is delayed by a time defined by the length of the "known data preamble." This delay allows all of a "known data preamble" to be fully communicated to channel encoder 216 prior to communication of the data symbols.

Channel encoder 216 can be configured for performing actions to represent the "known data preamble" and the symbol data in the form of a modulated quadrature amplitude-and-time-discrete digital signal. The modulated quadrature amplitude-and-time-discrete digital signal is also referred to herein as the global data communication signal 134 (described above in relation to FIG. 1). The global data communication signal 134 is defined by digital words which represent intermediate frequency (IF) modulated symbols comprised of bits of global data having a one (1) value or a zero (0) value. Methods for representing digital symbols by a quadrature amplitude-and-time-discrete digital signal are well known to persons having ordinary skill in the art, and therefore will not be described herein. However, it should be appreciated that channel encoder 216 can employ any known method for representing digital symbols by a quadrature amplitude-and-time-discrete digital signal.

As shown in FIG. 2, channel encoder 216 can be selected as a digital baseband modulator employing quadrature amplitude modulation (QAM) with distinct amplitude levels on quadrature axes. As such, the output of the QAM modulator is a complex data signal with in-phase (I) and quadrature-phase (Q) data components. Accordingly, channel encoder 216 is configured for communicating the quadrature data signal to the complex multiplier 224.

According to another embodiment of the invention, channel encoder 216 can be selected as a digital baseband modulator employing pulse amplitude modulation (PAM) with distinct amplitude levels. As such, the output of the PAM modulator is a real data signal. Accordingly, channel encoder 216 is configured for communicating this real data signal to the complex multiplier 224.

According to an embodiment of the invention, transmitter 102 is comprised of a sample rate matching device (not shown) between channel encoder 216 and complex multiplier 224. The sample rate matching device (not shown) can perform a sample rate increase on the global data communication signal 134 so that a sample rate of the signal is the same as a digital chaotic sequence communicated to complex multiplier 224. Still, the invention is not limited in this regard. For example, if the global data communication signal 134 and the digital chaotic sequence are generated as zero intermediate frequency (IF) signals, then transmitter 102 can be absent of the sample rate matching device (not shown).

Referring again to FIG. 2, complex multiplier 224 can be configured for performing a complex multiplication in the digital domain. The complex multiplier 224 is configured to receive an input from the channel encoder 216. The complex multiplier 224 is further configured to receive a protected data communications signal from the complex multiplier 254. In complex multiplier 224, the global data communication signal 134 from channel encoder 216 is multiplied by a sample rate matched chaotic sequence. The chaotically spread protected data communications signal 126 is generated in complex multiplier 254. The complex multiplier 224 is configured to communicate its output to interpolator 226.

Data source 260 is a protected data source. Data source 260 is generally an interface configured for receiving an input signal containing protected data from an external device (not shown). As such, data source 260 can be configured for receiving bits of data from the external data source (not shown). Data source 260 can further be configured for supplying bits of data to source encoder 262 at a particular data transfer rate.

Source encoder 262 is generally configured to encode the protected data received from the external device (not shown) using a forward error correction coding scheme. The bits of protected data received at or generated by source encoder 262 represent any type of information that may be of interest to a user. For example, the protected data can be used to represent text, telemetry, audio, or video data. Source encoder 262 can further be configured to supply bits of protected data to symbol formatter 264 at a particular data transfer rate.

Symbol formatter 264 is generally configured to process bits of protected data for forming channel encoded symbols. In a preferred embodiment, the source encoded symbols are formatted into parallel words compatible with phase shift keying (PSK) encoding. Symbol formatter 264 can further be configured for communicating the formatted to the multiplexer 266. Still, the invention is not limited in this regard.

Multiplexer 266 is generally configured for selecting symbol data to be routed to channel encoder 268 after a preamble period has expired. Multiplexer 266 can also be configured for communicating symbol data to channel encoder 268. In this regard, it should be appreciated that a communication of the symbol data to channel encoder 268 can be delayed by a time defined by the length of the "known data preamble." It should also be appreciated that the multiplexer 266 may be periodically switched to a known data sequence to help maintain phase loop tracking at the partial permission receiver 108.

Channel encoder 268 is generally configured for performing actions to represent the "known data preamble" and/or the symbol data in the form of a quadrature modulated amplitude-and-time-discrete digital signal. The quadrature modulated amplitude-and-time-discrete digital signal is defined by digital words which represent intermediate frequency (IF) modulated symbols comprised of bits of protected data having a one (1) value or a zero (0) value. Methods for representing digital symbols by a quadrature modulated amplitude-and-time-discrete digital signal are well known to persons having ordinary skill in the art, and therefore will not be described herein. However, it should be appreciated that channel encoder 268 can employ any known method for representing digital symbols by a quadrature amplitude-and-time-discrete digital signal.

As shown in FIG. 2, channel encoder 268 can be selected as a amplitude-and-time-discrete digital baseband modulator employing all forms of quadrature phase shift keying modulations. As such, the output of the quadrature amplitude-and-time-discrete baseband modulator includes an in-phase ("I") data and quadrature phase ("Q") data. Accordingly, channel encoder 268 is configured for communicating I and Q data to the phase rotator 270.

Phase rotator 270 can generally be comprised of a phase mapper 250, a phase-to-complex mapper 252, and a complex multiplier 240. Phase mapper 250 is configured for receiving a random number sequence from random number sequence (RNS) generator 242. RNS generators are well known to those having ordinary skill in the art, and therefore will not be described herein. However, it should be understood that any RNS generator, including a digital chaotic sequence generator, can be used without limitation. Notably, RNS generator 242 can be configured for receiving RNS generation parameters and/or a key from transmitter controller 210. RNS generation parameters are well known to those having ordinary skill in the art, and therefore will not be described herein. Similarly, keys are well known to those having ordinary skill in the art, and therefore will not be described herein. RNS generator 242 is configured for communicating a stream of formatted random numbers to phase mapper 250.

Phase mapper 250 is also configured for performing a phase mapping process using random numbers of the random number sequence. The phase mapping process can generally involve processing bits of random number data for forming encoded symbol data, such as phase shift keyed (PSK) data symbols. In the preferred embodiment, the phase mapper translates a random number sequence input to a phase angle. Phase mapper 250 is further configured for communicating a phase angle to the phase-to-complex mapper 252.

Phase-to-complex mapper 252 is configured for receiving a sequence of phase angles from the phase mapper 250. The phase-to-complex mapper is generally configured for transforming the phase angle sequence into a complex-valued (quadrature) amplitude-and-time discrete digital output phase sequence. In general, this transformation may be viewed as a mapping of a sequence of input phase angle references to the corresponding phase angles as complex values on the unit circle. Such mapping processes are well known to those having ordinary skill in the art, and therefore will not be described herein. The transformed quadrature amplitude-and-time discrete digital output phase sequence can have different word widths than the input sequence of phase angles. Phase-to-complex mapper 252 is also configured for communicating the complex-valued amplitude-and-time-discrete digital output phase sequences to complex multiplier 240. An optional sample rate matching device (not shown) may be included between the phase-to-complex mapper 252 and complex multiplier 240 to adjust the sample rate to one commensurate with phase modulated signal with protected data 120. Sample rate matching devices are well known to those having ordinary skill in the art, so will not be described herein.

Referring again to FIG. 2, complex multiplier 240 is configured for performing complex-valued digital multiplication operations using the complex-valued amplitude-and-time-discrete digital output phase sequence from phase-to-complex mapper 252 and the phase modulated signal 120 (described above in relation to FIG. 1) from channel encoder 268. The result of the complex-valued digital multiplication operations is a complex-valued amplitude-and-time-discrete digital representation of a phase rotated modulated IF signal (hereinafter referred to as the phase rotated signal 124). The phase rotated signal 124 comprises protected data symbols with rotated phase angles. Complex multiplier 240 is also configured to communicate the phase rotated signal 124 to the complex multiplier 254.

Complex multiplier 254 is generally configured for performing a complex multiplication in the digital domain. In digital complex multiplier 254, the phase rotated signal 124 is multiplied by a chaotic spreading code CSC. Chaotic spreading code CSC is a quadrature amplitude-and-time-discrete digital representation of a chaotic sequence. The chaotic sequence is generated by chaos generator 218 and real uniform to quadrature Gaussian statistics mapper (RUQG) 220. Chaos generator 218 is generally configured for generating chaotic sequences in accordance with the methods described below in relation to FIGS. 6-8. Accordingly, chaos generator 218 employs a set of polynomial equations, a set of constants, and/or a set of relatively prime numbers as modulus for use in chaotic sequence generation. The rate at which the digital chaotic sequence is generated is an integer multiple of a data symbol rate. The greater the ratio between the data symbol period and the sample period of the digital chaotic sequence the higher a spreading gain. Notably, chaos generator 218 can be configured for receiving initial conditions and sequence generation parameters from transmitter controller 210. Chaos generator 218 is also configured for communicating the chaotic sequence to RUQG 220.

RUQG 220 is generally configured for statistically transforming the chaotic spreading code CSC (or chaotic sequence) into a quadrature amplitude-and-time-discrete digital chaotic sequence with pre-determined statistical properties. The transformed digital chaotic sequence can have different word widths and/or different statistical distributions. For example, RUQG 220 may take in two (2) uniformly distributed real inputs from the chaos generator 218 and convert those via a complex-valued bivariate Gaussian transformation to a quadrature output having statistical characteristics of a Guassian distribution. Such conversion techniques are well understood by those having ordinary skill in the art, and therefore will not be described herein. However, it should be understood that such conversion techniques may use non-linear processors, look-up tables, iterative processing (CORDIC functions), or other similar mathematical processes. RUQG 220 is also configured for communicating transformed chaotic sequences to the complex multiplier 254.

According to an embodiment of the invention, RUQG 220 statistically transforms the chaotic spreading code CSC (or chaotic sequence) into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical equations (1) and (2).

$$G_1 = \sqrt{-2\log(u_1)} \cdot \cos(2\pi u_2) \quad (1)$$

$$G_1 = \sqrt{-2\log(u_1)} \cdot \sin(2\pi u_2) \quad (2)$$

where $\{u1, u2\}$ are uniformly distributed independent input random variables and $\{G_1, G_2\}$ are Gaussian distributed output random variables. The invention is not limited in this regard. The output of the RUQG 220 is the chaotic spreading code CSC.

Referring again to FIG. 2, complex multiplier 254 is configured for performing complex-valued digital multiplication operations using the amplitude-and-time-discrete digital chaotic sequence output CSC from RUQG 220 and the phase rotated signal 124 output from complex multiplier 240. The result of the complex-valued digital multiplication operations is a digital representation of a coherent chaotic sequence spread spectrum modulated IF signal (hereinafter referred to as the protected data communication signal 126). The protected data communication signal 126 comprises digital protected data that has been spread over a wide frequency bandwidth in accordance with the chaotic spreading code CSC (or chaotic sequence) generated by components 218, 220. Complex multiplier 254 is also configured to communicate the protected data communication signal 126 to the complex multiplier 224.

Complex multiplier 224 is configured for performing complex-valued digital multiplication operations using the protected data communication signal 126 output from complex multiplier 254 and the global data communication signal 134 output from channel encoder 216. The result of the complex-valued digital multiplication operations is a digital representation of a coherent chaotic sequence spread spectrum modulated IF signal (hereinafter referred to as the output communication signal 140). The output communication signal 140 comprises digital protected and global data that has been spread over a wide frequency bandwidth in accordance with the chaotic sequence generated by chaos generator 218. Complex multiplier 224 is also configured to communicate the output communication signal 140 to interpolator 226.

Interpolator 226, real part of complex multiplier 228, and quadrature digital local oscillator 230 form at least one intermediate frequency (IF) translator. IF translators are well known to persons having ordinary skill in the art, and therefore will not be described herein. However, it should be understood that components 226, 228, 230 can be collectively configured for frequency modulating a signal received from complex multiplier 224 to a sampled spread spectrum digital chaotic signal. The IF translator (i.e., component 228) is configured for communicating the sampled spread spectrum digital chaotic signal to the DAC 232, wherein the sampled spread spectrum digital chaotic signal has an increased sampling rate and a non-zero intermediate frequency. DAC 232 can be configured for converting the sampled spread spectrum digital chaotic signal to an analog signal. DAC 232 can also be configured for communicating the analog signal to anti-image filter 234.

Anti-image filter 234 is configured for removing spectral images from the analog signal to form a smooth time domain signal. Anti-image filter 234 is also configured for communicating a smooth time domain signal to the RF conversion device 236. RF conversion device 236 can be a wide bandwidth analog IF-to-RF up converter. RF conversion device 236 is configured for forming an RF signal by centering a smooth time domain signal at an RF for transmission. RF conversion device 236 is also configured for communicating RF signals to a power amplifier (not shown). The power amplifier (not shown) is configured for amplifying a received RF signal. The power amplifier (not shown) is also configured for communicating amplified RF signals to an antenna element 238 for communication to receivers 106, 108 (described above in relation to FIG. 1).

It should be understood that the digital generation of the digital chaotic sequences at transmitter 102 and receivers 106, 108 (described above in relation to FIG. 1) is kept closely coordinated under the control of a precision real time reference 212 clock. If the precision of the clock 212 is relatively high, then the synchronization of chaos generator 218 of transmitter 102 and the chaos generators (described below in relation to FIG. 4 and FIGS. 5-6) of the receivers 106, 108 is relatively close. Precision real time reference 212 allows the states of the chaos generators to be easily controlled with precision.

It should also be noted that the phase rotation can be performed after the combination of the phase modulated signal 120 and the chaotic spreading code CSC. In such a scenario, the transmitter architecture of FIG. 2 can be amended accordingly, i.e., the placement of components 218, 220, 254 and components 242, 270 are reversed so that the output of component 254 is communicated to component 240 and the output of component 270 is communicated to complex multiplier 224.

Figure 3:
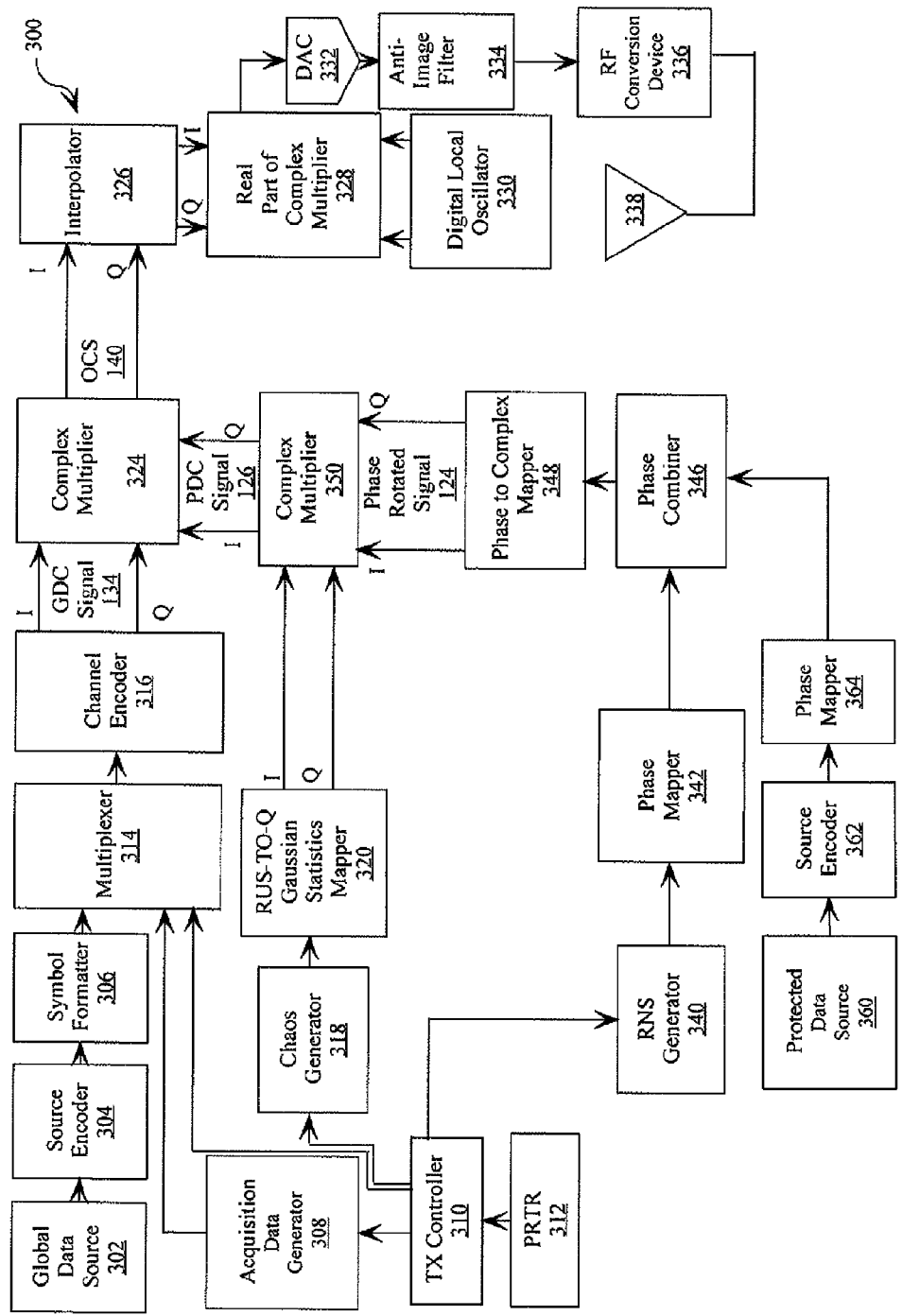
FIG. 3 is a more detailed block diagram of the transmitter shown in FIG. 2 according to an embodiment of the present invention.

Referring now to FIG. 3, there is provided a second exemplary architecture of a transmitter 300 which may be employed by the multiple access system 100. As shown in FIG. 3, transmitter 300 is comprised of data sources 302, 360, source encoders 304, 362, a symbol formatter 306, multiplexer 314, and a channel encoder 316. Transmitter 300 is also comprised of an acquisition data generator 308, a transmitter controller 310, a precision real time reference 312, an interpolator 326, a real part of complex multiplier 328, a digital local oscillator 330, a digital-to-analog converter (DAC) 332, an anti-image filter 334, an RF conversion device 336, and an antenna element 338. Transmitter 300 is further comprised of a random number sequence (RNS) generator 340, phase mappers 342, 364, a phase combiner 346, a phase-to-complex mapper 348, a chaos generator 318, a real uniform statistics to quadrature (RUS-to-Q) Gaussian statistics mapper (RUQGs) 320, and complex multipliers 350, 324.

Components 302, ..., 340, 350, 360, 362, 364 are the same as or substantially similar to components 202, ..., 238, 242, 250, 252, 260, 262 of FIG. 2, respectively. As such, the description provided above is sufficient for components 302, ..., 340, 350, 360, 362, 364 of transmitter 300.

Referring again to FIG. 3, the output of phase mapper 364 is a sequence of encoded symbol phase data. Phase mapper 364 is configured to communicate encoded symbol phase data to phase combiner 346. In one embodiment of the present invention, phase combiner 346 is configured to add the phase angles of the encoded symbol phase data with the RNS-driven phase angles generated by components 340, 342. Many other phase combination processes are known to those having ordinary skill in the art, so will not be described in detail herein. Still, embodiments the present invention are not limited in this regard.

RNS generator 340 is configured for generating a random number sequence. RNS generator 340 is also configured for communicating a random number sequence to phase mapper 342. Phase mapper 342 is generally configured to process bits of random number data for forming phase angles. Phase mapper 342 can further be configured for communicating said phase angles to phase combiner 346.

As noted above, phase combiner 346 is configured to add the phase angles of the encoded symbol phase data from phase mapper 364 with the phase angles from phase mapper 342. Phase combiner 346 is also configured for communicating an output signal to phase-to-complex encoder 348.

Phase-to-complex mapper 348 is configured for receiving a sequence of phase angles from the phase combiner 346. The phase-to-complex mapper 348 is generally configured for transforming the phase angle sequence into a complex-valued (quadrature) amplitude-and-time discrete digital output phase sequence. In general, this transformation may be viewed as a mapping of a sequence of input phase angle references to the corresponding phase angles as complex values on the unit circle. Such mapping processes are well known to those having ordinary skill in the art, and therefore will not be described herein. The transformed quadrature amplitude-and-time discrete digital output phase sequence can have different word widths than the input sequence of phase angles. Phase-to-complex mapper 348 is also configured for communicating the complex-valued amplitude-and-time-discrete digital output phase sequences to complex multiplier 350. An optional sample rate matching device (not shown) may be included between the phase-to-complex mapper 348 and complex multiplier 350 to adjust the sample rate to one commensurate with the chaotic spreading sequence produced by components 318 and 320. Sample rate matching devices are well known to those having ordinary skill in the art, so will not be described herein.

According to an embodiment of the invention, phase-to-complex mapper 348 is a numerically controlled oscillator (NCO). NCOs are well known to those having ordinary skill in the art, and therefore will not be described herein. The invention is not limited in this regard.

Receiver Architectures

Figure 4:
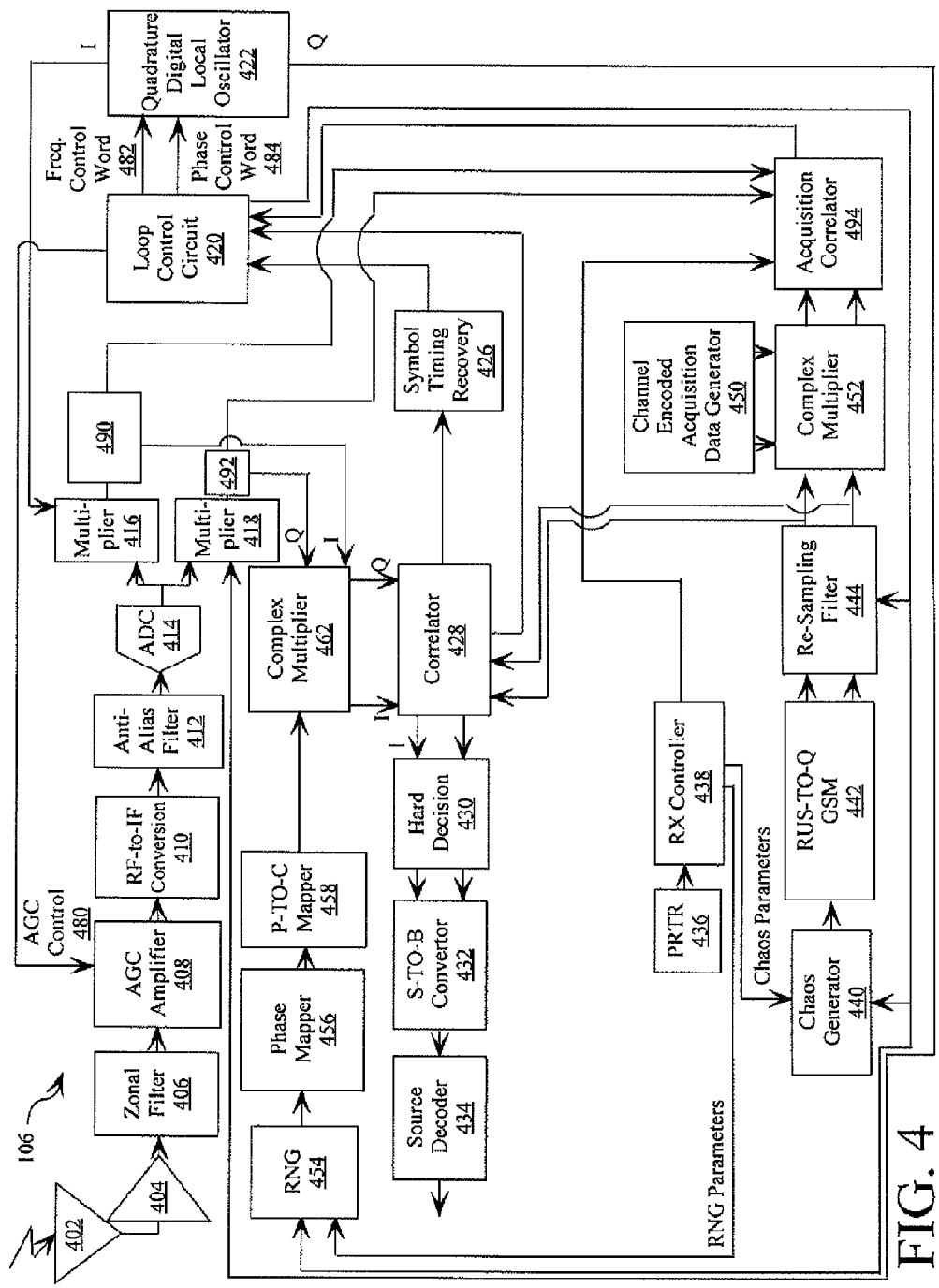
FIG. 4 is a more detailed block diagram of the full permission receiver of FIG. 1 according to an embodiment of the invention.

Referring now to FIG. 4, there is provided a more detailed block diagram of full permission receiver 106 of FIG. 1. Full permission receiver 106 is generally configured for receiving transmitted analog chaotic signals from transmitter 102 (described above in relation to FIG. 1 and FIG. 3). Receiver 106 is also generally configured for down converting and digitizing a received analog chaotic signal. Accordingly, receiver 106 comprises an antenna element 402, a low noise amplifier (LNA) 404, a zonal filter 406, an automatic gain control (AGC) amplifier 408, and AGC control word 480, a radio frequency (RF) to intermediate frequency (IF) conversion device 410, an anti-alias filter 412, and an analog-to-digital (A/D) converter 414.

Antenna element 402 is generally configured for receiving an analog input signal communicated from transmitter 102 over a communications link 104 (described above in relation to FIG. 1). Antenna element 402 can also be configured for communicating the analog input signal to LNA 404. LNA 404 is generally configured for amplifying a received analog input signal while adding as little noise and distortion as possible. LNA 404 can also be configured for communicating an amplified, analog input signal to zonal filer 406. Zonal filter 406 is configured for suppressing large interfering signals outside of bands of interest. Zonal filter 406 can also be configured for communicating filtered, analog input signals to the AGC amplifier 408. AGC amplifier 408 is generally a controllable gain amplifier configured for adjusting a gain of an analog input signal. The AGC amplifier is configured to accept a signal from the zonal filter 406 and the AGC control signal 480. AGC amplifier 408 is configured for communicating gain adjusted, analog input signals to the RF-to-IF conversion device 410.

RF-to-IF conversion device 410 is generally configured for mixing an analog input signal to a particular IF. RF-to-IF conversion device 410 is also configured for communicating mixed analog input signals to anti-alias filter 412. Anti-alias filter 412 is configured for restricting a bandwidth of a mixed analog input signal. Anti-alias filter 412 is also configured for communicating filtered, analog input signals to A/D converter 414. A/D converter 414 is configured for converting received analog input signals to digital signals. A/D converter 414 is also configured for communicating digital input signals to multipliers 416, 418.

Receiver 106 can also be configured for phase de-rotating a received signal to form the de-rotated signal 152, correlating the de-rotated signal 152 with a replica of the chaotic spreading code CSC' to form the correlated signal 154, and processing the correlated signal 154 to obtain protected and/or global data. The protected and global data can be converted into text, sound, pictures, navigational-position information, and/or any other type of useful payload information that can be communicated.

Notably, receiver 106 of FIG. 4 is designed to eliminate the drawbacks of conventional analog based coherent communications systems. In this regard, it should be understood that analog chaos circuits of conventional analog based coherent communications systems are synchronized by periodically exchanging state information. The exchange of state information requires a substantial amount of additional bandwidth. In contrast, receiver 106 is configured to synchronize strings of discrete time chaotic samples (i.e., chaotic sequences) without using a constant or periodic transfer of state update information. This synchronization feature of receiver 106 will become more apparent as the discussion progresses.

As shown in FIG. 4, receiver 106 further comprises multipliers 416, 418, lowpass filters 490, 492, a loop control circuit 420, a quadrature digital local oscillator (QDLO) 422, a frequency control word 482, a phase control word 484, complex multipliers 452, 462, a channel encoded acquisition data generator (CEADG) 450, a symbol timing recovery circuit 426, a receiver controller 438, a precision real time reference (PRTR) clock 436, and an acquisition correlator 494. Receiver 106 also includes correlator 428, hard decision device 430, symbol-to-bit (S/B) converter 432, and source decoder 434. Receiver 106 further comprises a random number sequence (RNS) generator 454, a phase mapper 456, a phase-to-complex mapper 458, a chaos generator 440, a real uniform statistic to quadrature Gaussian statistic mapper (RUQG) 442, and re-sampling filter 444. It should be noted that the functions of the RUQG 442 can be performed by the chaos generators 440. In such a scenario, receiver 106 is absent of the RUQG 442.

QDLO 422 is generally configured for generating a complex quadrature amplitude-and-time-discrete digital sinusoid at a given frequency. The digital sinusoid can be generated using a binary phase control word 484 and a binary frequency control word 482 received from the loop control circuit 420. QDLO 422 is also configured for communicating digital words representing in-phase components of the digital sinusoid to the complex multiplier 416. QDLO 422 is further configured for communicating digital words representing quadrature-phase components of the digital sinusoid to the complex multiplier 418.

Complex multiplier 416 is configured for receiving digital words from the A/D converter 414 and digital words from the in-phase component of the QDLO 422. Complex multiplier 416 is also configured for generating digital output words by multiplying digital words from A/D converter 414 by digital words from the QDLO 422. Complex multiplier 416 is further configured for communicating real data represented as digital output words to lowpass filter 490.

Complex multiplier 418 is configured for receiving digital words from A/D converter 414 and digital words from the quadrature-phase component of the QDLO 422. Complex multiplier 418 is also configured for generating digital output words by multiplying the digital words from A/D converter 414 by the digital words from QDLO 422. Complex multiplier 418 is further configured for communicating imaginary data represented as digital output words to lowpass filter 492.

Lowpass filter 490 is configured to receive the real digital data from multiplier 416 and lowpass filter the real data to generate the in-phase digital data component of the quadrature baseband form of the received signal. Lowpass filter 490 is further configured to communicate the in-phase digital output words to acquisition correlator 494 and complex multiplier 462. Lowpass filter 492 is configured to receive the imaginary digital data from multiplier 418 and lowpass filter the imaginary data to generate the quadrature-phase digital data component of the quadrature baseband form of the received signal. Lowpass filter 492 is further configured to communicate the quadrature-phase digital output words to acquisition correlator 494 and complex multiplier 462.

Complex multiplier 462 is configured for performing complex multiplications in the digital domain. Each of the complex multiplications can generally involve multiplying quadrature digital words received from lowpass filters 490, 492 by complex values determined by a random number sequence. Complex multiplier 462 is configured for receiving the complex value sequence from the phase-to-complex mapper 458. The complex multiplier 462 is further configured for communicating the result of the multiplication to the correlator 428. The random number sequence is generated by RNS generator 454. The random number sequence is a replica of the random number sequence generated by RNS generator 340 of transmitter 102 (described above in relation to FIG. 3). The random number sequence is synchronized in time and frequency with the random number sequence generated by RNS generator 340 of transmitter 102.

RNS generator 340 is configured for communicating random number sequences to phase mapper 456. In this regard, it should be appreciated that RNS generator 340 is coupled to receiver controller 438. Receiver controller 438 is configured to control RNS generator 340 so that it generates a random number sequence with the correct initial state when receiver 106 is in an acquisition mode and a tracking mode. Receiver controller 438 is also configured for communicating a key and/or RNS generation parameters to RNS generator 340. The key and/or RNS generation parameters are used by RNS generator 340 for generating a random number sequence. If key and/or RNS generation parameters are not communicated to RNS generator 340, then RNS generator 340 will not produce a random number sequence which is a replica of the random number sequence generated at transmitter 102.

Phase mapper 456 is also configured for performing a phase mapping process using random numbers of the random number sequence. The phase mapping process can generally involve processing bits of random number data for forming encoded symbol data, such as phase shift keyed (PSK) data symbols. In the preferred embodiment, the phase mapper translates a random number sequence input to a phase angle. Phase mapper 456 is further configured for communicating a phase angle to the phase-to-complex mapper 458.

Phase-to-complex mapper 458 is configured for receiving a sequence of phase angles from the phase mapper 456. The phase-to-complex mapper is generally configured for transforming the phase angle sequence into a complex-valued (quadrature) amplitude-and-time discrete digital output phase sequence. In general, this transformation may be viewed as a mapping of a sequence of input phase angle references to the corresponding phase angles as complex values on the unit circle. Such mapping processes are well known to those having ordinary skill in the art, and therefore will not be described herein. The transformed quadrature amplitude-and-time discrete digital output phase sequence can have different word widths than the input sequence of phase angles. Phase-to-complex mapper 458 is also configured for communicating the complex-valued amplitude-and-time-discrete digital output phase sequences to complex multiplier 462. An optional sample rate matching device (not shown) may be included between the phase-to-complex mapper 458 and complex multiplier 462 to adjust the sample rate to one commensurate with phase modulated signal with protected data 120. Sample rate matching devices are well known to those having ordinary skill in the art, so will not be described herein.

Referring again to FIG. 4, complex multiplier 462 is configured for performing complex-valued digital multiplication operations using the digital complex values output from phase-to-complex mapper 458 and the digital words from lowpass filters 490, 492. The result of the complex-valued digital multiplication operations is a digital representation of the phase de-rotated signal 152 (described above in relation to FIG. 1). Complex multiplier 462 is also configured to communicate the phase de-rotated signal 152 to correlator 428.

The chaotic sequence is generally generated in accordance with the method described below in relation to FIGS. 6-8. Accordingly, chaos generators 440 employs sets of polynomial equations, sets of constants, and/or sets of relatively prime numbers as modulus for use in chaotic sequence generations. Chaos generator 440 can be configured for receiving initial conditions from receiver controller 438. The initial conditions can define arbitrary sequence starting locations as well as chaotic sequence generation parameters.

Chaos generator 440 is configured for communicating chaotic sequences to the RUQG 442. In this regard, it should be appreciated that chaos generator 440 is coupled to receiver controller 438. Receiver controller 438 is configured to control chaos generator 440 so that chaos generator 440 generates a chaotic sequence with the correct initial state when receiver 106 is in an acquisition mode and a tracking mode.

RUQG 442 is generally configured for statistically transforming digital chaotic sequences into transformed digital chaotic sequences. Each of the transformed digital chaotic sequences can have a characteristic form. The characteristic form can include, but is not limited to, real, complex, quadrature, and combinations thereof. Each of the transformed digital chaotic sequences can have different word widths and/or different statistical distributions. RUQG 442 is also configured for communicating transformed chaotic sequences to re-sampling filter 444.

According to the embodiment of the invention, RUQG 442 is configured for statistically transforming digital chaotic sequences into quadrature Gaussian forms of the digital chaotic sequences. RUQG 442 is also configured for communicating quadrature Gaussian form of the digital chaotic sequence to re-sampling filters 444. More particularly, RUQGs 442 communicate in-phase ("I") data and quadrature phase ("Q") data to re-sampling filter 444. The invention is not limited in this regard.

Referring again to FIG. 4, re-sampling filter 444 is configured for making chaos sample rates compatible with a received signal sample rate when receiver 106 is in acquisition mode. Re-sampling filter 444 is further configured to compensate for transmit and receive clock offsets with less than a certain level of distortion when receiver 106 is in a steady state demodulation mode. In this regard, it should be appreciated that re-sampling filter 444 is configured for converting the sampling rates of in-phase ("I") and quadrature-phase ("Q") data sequences from first sampling rates to second sampling rates without changing the spectrum of the data contained therein. Re-sampling filter 444 is configured to communicate in-phase ("I") and quadrature-phase ("Q") data sequences to correlator 428 and complex multiplier 452.

It should be noted that if a sampled form of a chaotic sequence is thought of as discrete samples of a continuous band limited chaos then re-sampling filter 444 is effectively tracking the discrete time samples, computing continuous representations of the chaotic sequences, and re-sampling the chaotic sequences at the discrete time points required to match the discrete time points sampled by the A/D converter 414. In effect, input values and output values of the re-sampling filter 444 is not exactly the same because the values are samples of the same waveform taken at slightly offset times. However, the values are samples of the same waveform so the values have the same power spectral density.

Referring again to FIG. 4, CEADG 450 is configured for generating modulated acquisition sequences. CEADG 450 is also configured for communicating modulated acquisition sequences to complex multiplier 452. Complex multiplier 452 is configured for performing complex multiplications in the digital domain to yield references for the digital input signal. Each of the complex multiplications can involve multiplying a modulated acquisition sequence received from CEADG 450 by a digital representation of a chaotic sequence. Complex multiplier 452 is also configured for communicating reference signals to the acquisition correlator 494.

Correlator 428 is configured for correlating locally generated chaos with the de-rotated signal 152 (described above in relation to FIG. 1) received from complex multiplier 462 to recover the protected and global data. In this regard, it should be understood that, the sense of the real and imaginary components of each correlation is directly related to the values of the real and imaginary components of the symbols of a de-rotated signal 152. It should also be understood that the magnitudes relative to a reference magnitude of the real and imaginary components of each correlation can be directly related to the magnitude values of the real and imaginary components of the amplitude modulated symbols of a de-rotated signal 152. Said reference value is dependent on the processing gain of the correlator, the gain control value, and the overall gain of the receiver signal processing chain. Methods for calculating a reference magnitude are known to those having ordinary skill in the art, so shall not be discussed in detail herein. Thus, the data recovery correlator 428 includes both phase and magnitude components of symbol soft decisions. The phrase "soft decisions", as used herein, refers to soft-values (which are represented by soft-decision bits) that comprise information about the bits contained in a sequence. Soft-values are values that represent the probability that a particular symbol is an allowable symbol. For example, a soft-value for a particular binary symbol can indicate that a probability of a bit being a one (1) is $p(1)=0.3$. Conversely, the same bit can have a probability of being a zero (0) which is $p(0)=0.7$.

Correlator 428 is also configured for communicating PSK soft decisions to a hard decision device 430 for final symbol decision making. Final symbol decision making in the hard decision device includes decisions based on both the correlated phase and magnitude relative to a reference magnitude level. Protected data is recovered via the hard decisions of symbol phase, while global data is recovered via the hard decisions of the symbol magnitudes relative to said reference magnitude level. Hard decision device 430 is configured for communicating symbol decisions to S/B converter 432. S/B converter 432 is configured for converting symbols to a binary form. S/B converter 432 is also configured for communicating a binary data sequence to source decoder 434. Source decoder 434 is configured for decoding FEC applied at transmitter 102 (described above in relation to FIG. 1 and FIG. 2). Source decoder 434 is also configured for passing decoded bit streams to one or more external devices (not shown) utilizing the decoded protected data. It should be noted that the hard decision device 430 performs symbol decisions for both the global and protected data. In some embodiments, hard decisions of protected data may be separated from hard decisions of global data. The invention is not limited in this regard.

Correlator 428 is generally configured for acquiring initial timing information associated with a chaotic sequence and initial timing associated with a data sequence. Correlator 428 is further configured for tracking phase and frequency offset information between a chaotic sequence and a digital input signal and for tracking input signal magnitude information between the chaotic sequence and the digital input signal. Methods for acquiring initial timing information are well known to persons having ordinary skill in the art, and therefore will not be described herein. Similarly, methods for tracking phase/frequency offset information are well known to persons having ordinary skill in the art, and therefore will not be described herein. However, it should be appreciated that any such method for acquiring initial timing information and/or for tracking phase/frequency offset information can be used without limitation.

Correlator 428 is configured for communicating magnitude and phase information as a function of time to the loop control circuit 420. Loop control circuit 420 is configured for using magnitude and phase information to calculate a deviation of an input signal magnitude from a nominal range and to calculate phase/frequency offset information. The calculated information can be used to synchronize a chaotic sequence with a digital input signal. Loop control circuit 420 is also configured for communicating phase/frequency offset information to the QDLO 422 and for communicating gain deviation compensation information to the AGC amplifier 408. Loop control circuit 420 is further configured for communicating retiming control signals to re-sampling filter 444, chaos generator 440, and random number generator 454.

Precision real time reference 436 is the same as or substantially similar to the precision real time reference 212 of FIG. 2. The description provided above in relation to the precision real time reference 212 is sufficient for understanding the precision real time reference 436 of FIG. 4.

The operation of receiver 106 will now be briefly described with regard to an acquisition mode and a steady state demodulation mode.

Acquisition Mode:

In acquisition mode, re-sampling filter 444 performs a rational rate change and forwards a transformed chaotic sequence to a digital complex multiplier 452. CEADG 450 generates a modulated acquisition sequence and forwards the same to a particular digital complex multiplier 452. Complex multiplier 452 performs a complex multiplication in the digital domain. In complex multiplier 452, a modulated acquisition sequence from CEADG 450 is multiplied by a digital representation of a chaotic sequence to yield a reference for a digital input signal that was generated at transmitter 102 (described above in relation to FIG. 1 and FIG. 2) to facilitate initial acquisition. The chaotic sequence is generated in chaos generator 440 and RUQG 442. Complex multiplier 452 is configured to communicate the result of the digital complex multiplications to acquisition correlator 494.

The acquisition correlator 494 is generally configured for acquiring initial timing information associated with a chaotic sequence and initial timing associated with a data sequence. The acquisition correlator 494 is further configured for acquiring initial phase and frequency offset information between a chaotic sequence and a digital input signal. Methods for acquiring initial timing information are well known to persons having ordinary skill in the art, and therefore will not be described herein. Similarly, methods for acquiring initial phase/frequency offset information are well known to persons having ordinary skill in the art, and therefore will not be described herein. However, it should be appreciated that any such method for acquiring initial timing information and/or for tracking phase/frequency offset information can be used without limitation.

The acquisition correlator 494 is configured for communicating magnitude and phase information as a function of time to the loop control circuit 420. Loop control circuit 420 is configured for using magnitude and phase information to calculate a deviation of an input signal magnitude from a nominal range and to calculate timing, phase, and frequency offset information. The calculated information can be used to synchronize a chaotic sequence with a digital input signal. Loop control circuit 420 is also configured for communicating phase/frequency offset information to the QDLO 422 and for communicating gain deviation compensation information to the AGC amplifier 408. Loop control circuit 420 is further configured for communicating retiming control signals to re-sampling filter 444 and chaos generator 440.

Steady State Demodulation Mode:

In the embodiment shown in FIG. 4, steady state demodulation mode, correlator 428 tracks the correlation between the received modulated signal and the locally generated chaos close to the nominal correlation peak to generate magnitude and phase information as a function of time. This information is passed to loop control circuit 420. Loop control circuit 420 applies appropriate algorithmic processing to this information to extract phase offset, frequency offset, and magnitude compensation information. Correlator 428 also passes its output information, based on correlation times terminated by symbol boundaries, to a symbol timing recover circuit 426 and global/protected hard decision device 430.

Loop control circuit 420 monitors the output of correlator 428. When loop control circuit 420 detects fixed correlation phase offsets, the phase control word of QDLO 422 is modified to remove the phase offset. When loop control circuit 420 detects phase offsets that change as a function of time, it adjusts re-sampling filter 444 which act as an incommensurate re-sampler when receiver 106 is in steady state demodulation mode or the frequency control word of QDLO 422 is modified to remove frequency or timing offsets.

When correlator 428 output indicates that the received digital input signal timing has "drifted" more than plus or minus a half (½) of a sample time relative to a locally generated chaotic sequence, loop control circuit 420 (1) adjusts a correlation window in an appropriate temporal direction by one sample time, (2) advances or retards a state of the local chaos generator 440 by one iteration state, (3) advances or retards a state of the local random number generator 454, and (4) adjusts re-sampling filter 444 to compensate for the time discontinuity. This loop control circuit 420 process keeps chaos generator 218 of transmitter 102 (described above in relation to FIG. 2) and chaos generator 440 of receiver 106 synchronized to within half (½) of a sample time. This loop control circuit 420 process keeps random number generator 242 of transmitter 102 (described above in relation to FIG. 2) and random number generator 454 of receiver 106 synchronized to within half (½) of a sample time.

If a more precise temporal synchronization is required to enhance performance, a re-sampling filter can be implemented as a member of the class of polyphase fractional time delay filters. This class of filters is well known to persons having ordinary skill in the art, and therefore will not be described herein.

As described above, a number of chaotic samples are combined with an information symbol at transmitter 102. Since transmitter 102 and receiver 106 timing are referenced to two (2) different precision real time reference clock 212, 436 oscillators, symbol timing must be recovered at receiver 106 to facilitate robust demodulation. In another embodiment, symbol timing recovery can include (1) multiplying a received input signal by a complex conjugate of a locally generated chaotic sequence using a complex multiplier 424, (2) computing an N point running average of the product where N is a number of chaotic samples per symbol time, (3) storing the values, the maximum absolute values of the running averages, and the time of occurrence, and (4) statistically combining the values at the symbol timing recovery circuit 426 to recover symbol timing.

In this steady state demodulation mode, symbol timing recovery circuit 426 communicates symbol onset timing to correlator 428 for controlling an initiation of a symbol correlation. Correlator 428 correlates a locally generated chaotic sequence with a received digital input signal during symbol duration. The sense and magnitude of real and imaginary components of the correlation are directly related to the values of the real and imaginary components of PSK symbols of a digital input signal. Accordingly, correlator 428 generates PSK symbol soft decisions. Correlator 428 communicates the symbol phase and magnitude soft decisions to hard decision device 430 for final symbol decision making. Hard decision device 430 determines symbol decisions using the symbol soft decisions. Global data symbol decisions are performed using the magnitude of the soft symbol decisions. Protected data symbol decisions are performed using the phase of the soft symbol decisions. Thereafter, hard decision device 430 communicates the symbols to S/B converter 432. S/B converter 432 converts symbol decisions to binary forms. S/B converter 432 communicates binary data sequences to source decoders 434. Source decoder 434 decides FEC applied at transmitter 102 (described above in relation to FIG. 1 and FIG. 2). Source decoder 434 also passes the decoded bit stream to one or more external devices (not shown) utilizing the decoded data.

Figure 5:
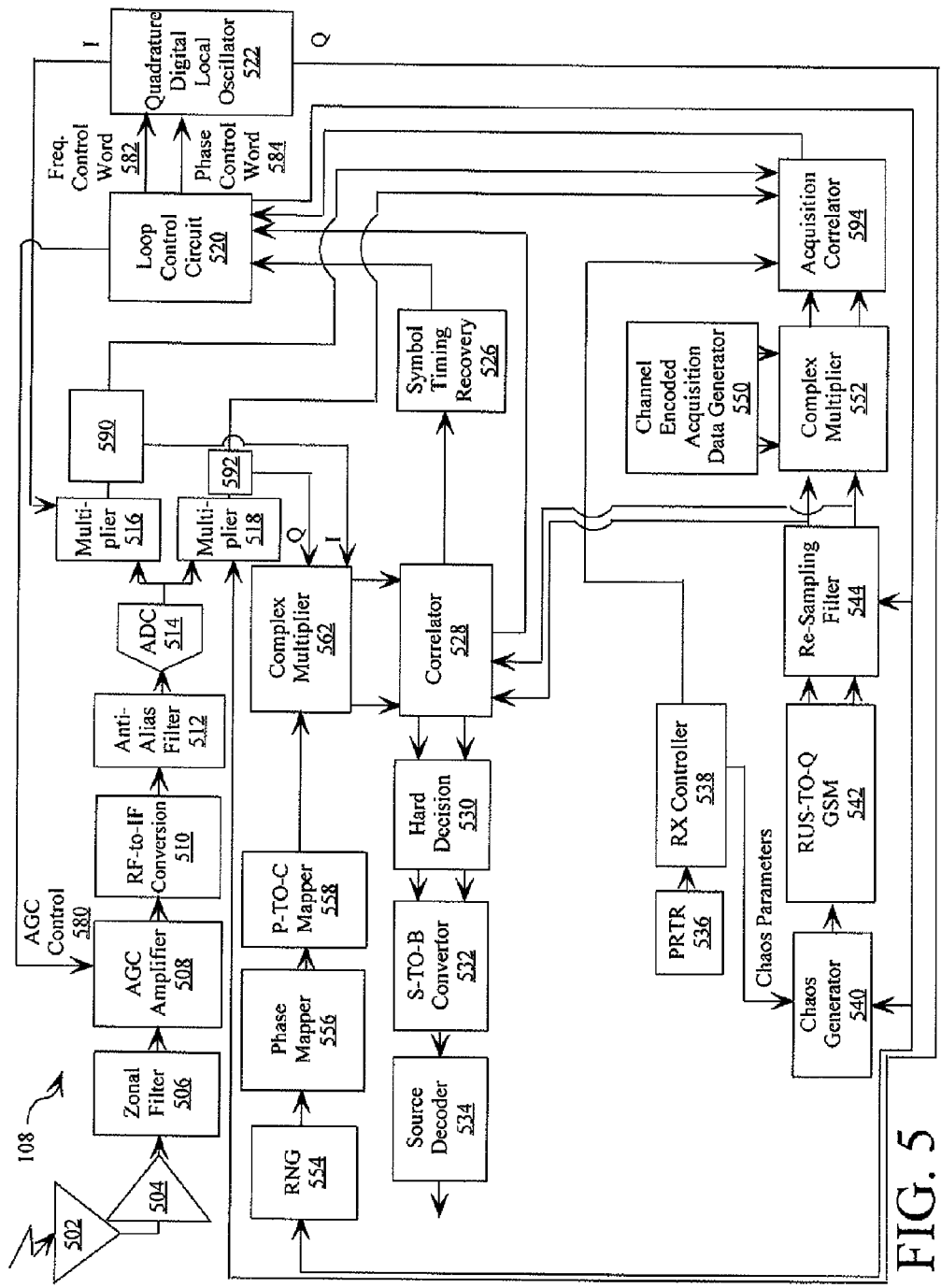
FIG. 5 is a more detailed block diagram of the partial permission receiver of FIG. 1 according to an embodiment of the invention.

Referring now to FIG. 5, there is provided a block diagram of an exemplary embodiment of receiver 108 of FIG. 1. Receiver 108 is generally configured for receiving transmitted analog chaotic signals from the transmitter 102 (described above in relation to FIGS. 1-2), down converting the received analog chaotic signal, and digitizing the down converted analog chaotic signal. Receiver 108 is also generally configured for acquiring, tracking, and de-spreading a transmitted analog chaotic signal by correlating it with a de-spreading code.

It should be noted that receiver 108 has the same or substantially similar architecture as receiver 106 of FIG. 4. However, receiver 108 is unable to generate a replica of the random number sequence generated at transmitter 102, i.e., receiver 108 does not have a key or random number generation parameter necessary for generating a replica of the random number sequence 454 generated at transmitter 102. In effect, receiver 108 is unable to decipher the transmitter PSK protected data symbols. However, the invention is not limited to the receiver architecture shown in FIG. 5.

Chaos Generators and Digital Chaotic Sequence Generation

Figure 6:
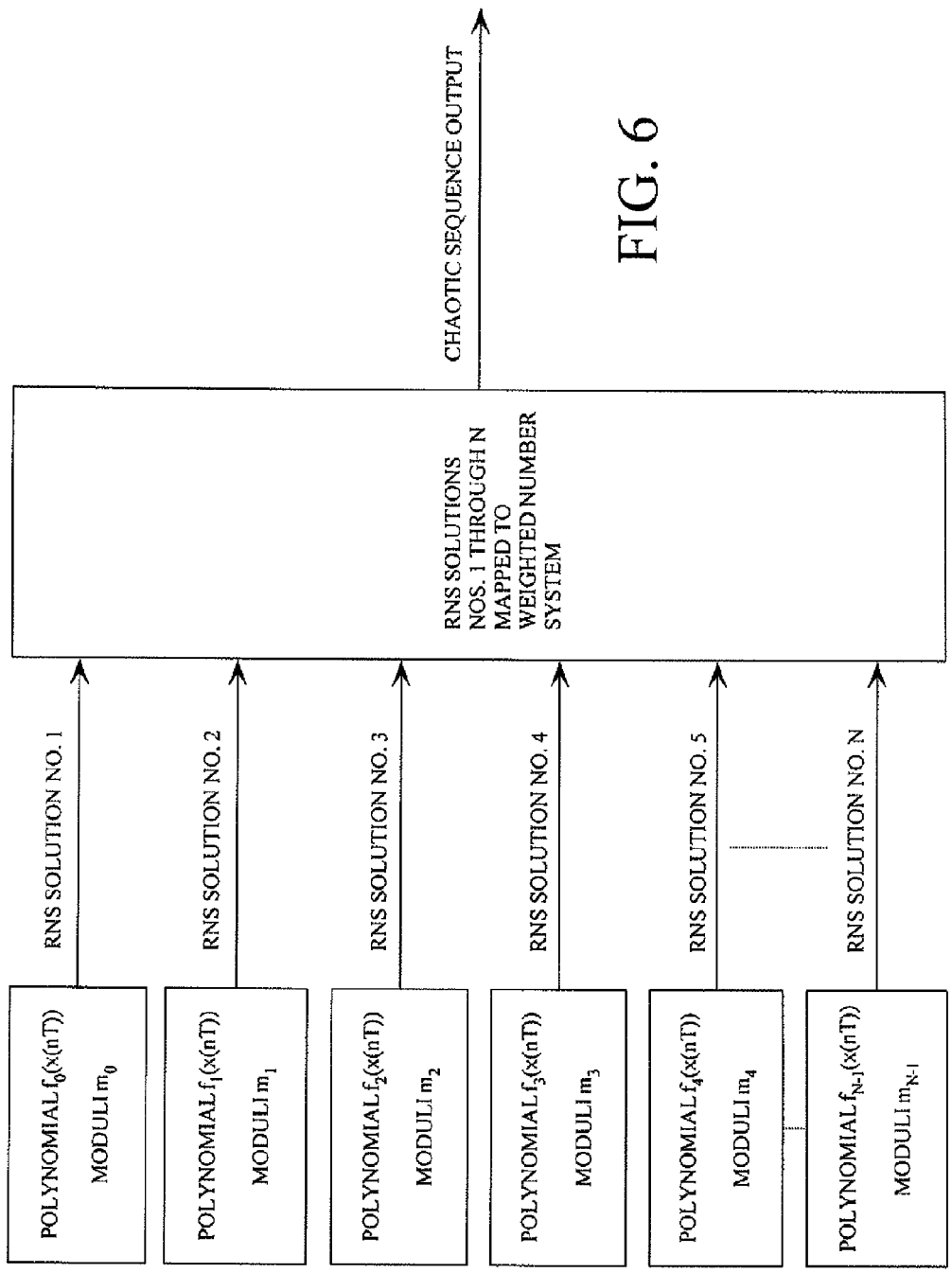
FIG. 6 is a conceptual diagram of the chaos generators of FIGS. 2-5.

Referring now to FIG. 6, there is provided a conceptual diagram of a chaos generator 218, 318, 440 (described above in relation to FIGS. 2-5). As shown in FIG. 6, generation of the chaotic sequence begins with N polynomial equations $f_0(x(nT)), \ldots, f_{N-1}(x(nT))$. The polynomial equations $f_0(x(nT)), \ldots, f_{N-1}(x(nT))$ can be selected as the same polynomial equation or as different polynomial equations. According to an aspect of the invention, the polynomial equations $f_0(x(nT)), \ldots, f_{N-1}(x(nT))$ are selected as irreducible polynomial equations having chaotic properties in Galois field arithmetic.

Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (f). For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·h(x(nT)).

Each of the polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e., modulo operations. Modulo operations are well known to persons having ordinary skill in the art, and therefore will not be described herein. However, it should be appreciated that an RNS residue representation for some weighted value "a" can be defined by mathematical equation (3).

$$R = \{a \text{ modulo } m_0, a \text{ modulo } m_1, \ldots, a \text{ modulo } m_{N-1}\} \quad (3)$$

where R is an RNS residue N-tuple value representing a weighted value "a" and $m_0, m_1, \ldots, m_{N-1}$ respectively are the moduli for RNS arithmetic operations applicable to each polynomial equation $f_0(x(nT)), \ldots, f_{N-1}(x(nT))$. R(nT) can be a representation of the RNS solution of a polynomial equation f(x(nT)) defined as R(nT)={$f_0(x(nT))$ modulo $m_0$, $f_1(x(nT))$ modulo $m_1, \ldots, f_{N-1}(x(nT))$ modulo $m_{N-1}$}.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers", as used herein, refers to a collection of natural numbers having no common divisors except one (1). Consequently, each RNS arithmetic operation employed for expressing a solution as an RNS residue value uses a different prime number $p_0, p_1, \ldots, P_{N-1}$ as a moduli $m_0, m_1, \ldots, m_{N-1}$.

The RNS residue value calculated as a solution to each one of the polynomial equations $f_0(x(nT)), \ldots, f_{N-1}(x(nT))$ will vary depending on the choice of prime numbers $p_0, p_1, \ldots, P_{N-1}$ selected as a moduli $m_0, m_1, \ldots, m_{N-1}$. Moreover, the range of values will depend on the choice of relatively prime numbers $p_0, p_1, \ldots, P_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_0(x(nT))$ has an integer value between zero (0) and four hundred ninety (490).

According to an embodiment of the invention, each of the polynomial equations $f_0(x(nT)), \ldots, f_{N-1}(x(nT))$ is selected as an irreducible cubic polynomial equation having chaotic properties in Galois field arithmetic. Each of the polynomial equations $f_0(x(nT)), \ldots, f_{N-1}(x(nT))$ can also be selected to be a constant or varying function of time. The irreducible cubic polynomial equation is defined by a mathematical equation (4).

$$f(x(nT)) = Q(k)x^3(nT) + R(k)x^2(nT) + S(k)x(nT) + C(k,L) \quad (4)$$

where:
x is value for a variable defining a sequence location;
n is a sample time index value;
k is a polynomial time index value;
L is a constant component time index value;
T is a fixed constant having a value representing a time interval or increment;
Q, R, and S are coefficients that define the polynomial equation f(x(nT)); and
C is a coefficient of x(nT) raised to a zero power and is therefore a constant for each polynomial characteristic.

In a preferred embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the polynomial equations $f_0(x(nT)), \ldots, f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots, m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 6 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 6, it should be appreciated that each of the RNS solutions No. 1, ..., No. N is expressed in a binary number system representation. As such, each of the RNS solutions No. 1, ..., No. N is a binary sequence of bits. Each bit of the sequence has a zero (0) value or a one (1) value. Each binary sequence has a bit length selected in accordance with particular moduli.

According to an embodiment of the invention, each binary sequence representing a residue value has a bit length (BL) defined by a mathematical equation (5).

$$BL = \text{Ceiling}[\text{Log } 2(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_1$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762, 191,059,523$. The binary number system representation of each RNS solution can be computed using Ceiling[Log 2(3,563,762,191,059,523)] = Ceiling[51.66] = 52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Still, the invention is not limited in this regard.

Referring again to FIG. 6, the RNS solutions No. 1, ..., No. N are mapped to a weighted number system representation thereby forming a chaotic sequence output. The phrase "weighted number system", as used herein, refers to a number system other than a residue number system. Such weighted number systems include, but are not limited to, an integer number system, a binary number system, an octal number system, and a hexadecimal number system.

According to an aspect of the invention, the RNS solutions No. 1, ..., No. N are mapped to a weighted number system representation by determining a series of digits in the weighted number system based on the RNS solutions No. 1, ..., No. N. The term "digit", as used herein, refers to a symbol of a combination of symbols to represent a number. For example, a digit can be a particular bit of a binary sequence. According to another aspect of the invention, the RNS solutions No. 1, ..., No. N are mapped to a weighted number system representation by identifying a number in the weighted number system that is defined by the RNS solutions No. 1, ..., No. N. According to yet another aspect of the invention, the RNS solutions No. 1, ..., No. N are mapped to a weighted number system representation by identifying a truncated portion of a number in the weighted number system that is defined by the RNS solutions No. 1, ..., No. N. The truncated portion can include any serially arranged set of digits of the number in the weighted number system. The truncated portion can also be exclusive of a most significant digit of the number in the weighted number system. The truncated portion can be a chaotic sequence with one or more digits removed from its beginning and/or ending. The truncated portion can also be a segment including a defined number of digits extracted from a chaotic sequence. The truncated portion can further be a result of a partial mapping of the RNS solutions No. 1, ..., No. N to a weighted number system representation.

According to an embodiment of the invention, a mixed-radix conversion method is used for mapping RNS solutions No. 1, ..., No. N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{''} \text{ See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle m_1 = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, a_2 = \left\langle \left\lfloor \frac{x}{m_1} \right\rfloor \right\rangle_{m_2}, a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}$$

." See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions No. 1, . . . , No. N to a weighted number system representation. The CRT arithmetic operation can be defined by a mathematical equation (6) [returning to zero (0) based indexing].

$$Y = \left\langle \begin{array}{l} \langle [3x_0^3((n-1)T) + 3x_0^2((n-1)T) + x_0((n-1)T) + C_0(nT)]b_0 \rangle^{p_0} \frac{M}{p_0} \rangle_M + \ldots + \\ \langle [3x_{N-1}^3((n-1)T) + 3x_{N-1}^2((n-1)T) + x_{N-1}((n-1)T) + C_{N-1}(nT)]b_{N-1} \rangle^{p_{N-1}} \frac{M}{p_{N-1}} \rangle_M \end{array} \right\rangle \quad (6)$$

Mathematical equation (6) can be re-written as mathematical equation (7).

$$Y = \left\langle \begin{array}{l} \langle [3x_0^3((n-1)T) + 3x_0^2((n-1)T) + x_0((n-1)T) + C_0(nT)]b_0 \rangle^{p_0} \frac{M}{p_0} \rangle_M + \ldots + \\ \langle [3x_{N-1}^3((n-1)T) + 3x_{N-1}^2((n-1)T) + x_{N-1}((n-1)T) + C_{N-1}(nT)]b_{N-1} \rangle^{p_{N-1}} \frac{M}{p_{N-1}} \rangle_M \end{array} \right\rangle \quad (7)$$

where Y is the result of the CRT arithmetic operation;
n is a sample time index value;
T is a fixed constant having a value representing a time interval or increment;
$x_0, \ldots, x_1$ are RNS solutions No. 1, . . . , No. N;
$p_0, p_1, \ldots, p_{N-1}$ are prime numbers;
M is a fixed constant defined by a product of the relatively prime numbers $p_0, p_1, \ldots, p_{N-1}$; and
$b_0, b_1, \ldots, b_{N-1}$ are fixed constants that are chosen as the multiplicative inverses of the product of all other primes modulo $p_0, p_1, \ldots, p_{N-1}$, respectively.
Equivalently, $$b_j = \left( \frac{M}{p_j} \right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1.

In other embodiments of the present invention, all $b_j$'s can be set equal to one or more non-zero values without loss of the chaotic properties. The invention is not limited in this regard.

Referring again to FIG. 6, the chaotic sequence output can be expressed in a binary number system representation. As such, the chaotic sequence output can be represented as a binary sequence. Each bit of the binary sequence has a zero (0) value or a one (1) value. The chaotic sequence output can have a maximum bit length (MBL) defined by a mathematical equation (8).

$$MBL=Ceiling[Log\ 2(M)] \quad (8)$$

where M is the product of the relatively prime numbers $p_0, p_1, \ldots, p_{N-1}$ selected as moduli $m_0, m_1, \ldots, m_{N-1}$. In this regard, it should be appreciated that M represents a dynamic range of a CRT arithmetic operation. The phrase "dynamic range", as used herein, refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059,523). By substituting the value of M into mathematical equation (8), the bit length (BL) for a chaotic sequence output Y expressed in a binary system representation can be calculated as follows: BL=Ceiling[Log 2 (3,563,762,191,059,523)]=52 bits. As such, the chaotic sequence output is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output can be a binary sequence representing a truncated portion of a value between zero (0) and M−1. In such a scenario, the chaotic sequence output can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (4) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1ms))=3x^3((n-1)\cdot 1ms)+3x^2((n-1)\cdot 1ms)+x((n-1)\cdot 1\ ms)+8$ modulo 503. n is a variable having a value defined by an iteration being performed. x has a value allowable in a residue ring. In a first iteration, n equals one (1) and x is selected as two (2) which is allowable in a residue ring. By substituting the value of n and x into the stated polynomial equation f(x(nT)), a first solution having a value forty-six (46) is obtained. In a second iteration, n is incremented by one and x equals the value of the first solution, i.e., forty-six (46) resulting in the solution 298,410 mod 503 or one hundred thirty-one (131). In a third iteration, n is again incremented by one and x equals the value of the second solution.

Figure 7:
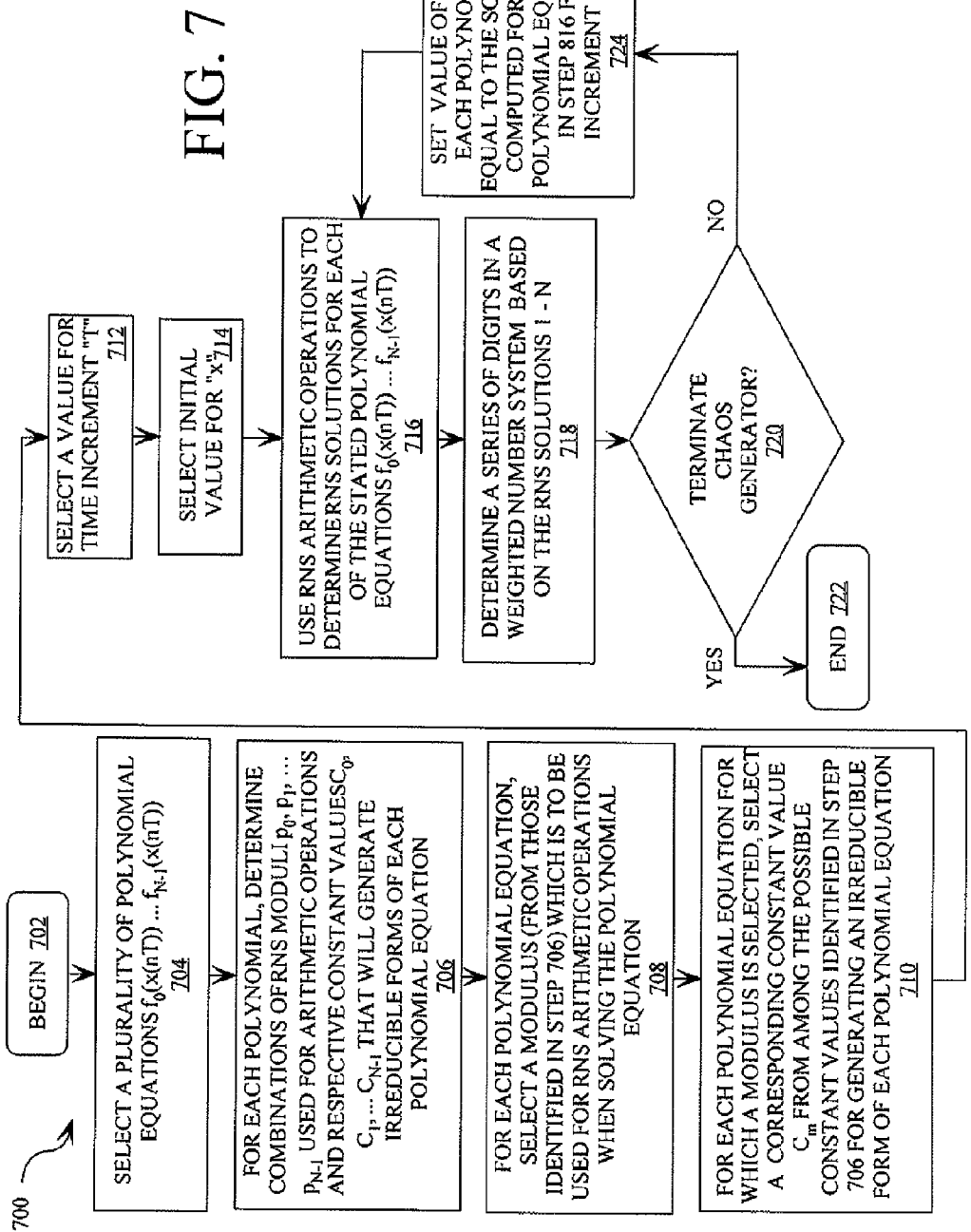
FIG. 7 is a flow diagram of a method for generating a chaotic spreading code (or chaotic sequence) according to an embodiment of the invention.

Referring now to FIG. 7, there is provided a flow diagram of a method 700 for generating a chaotic sequence according to an embodiment of the invention. As shown in FIG. 7, method 700 begins with step 702 and continues with step 704. In step 704, a plurality of polynomial equations $f_0(x(nT)), \ldots, f_{N-1}(x(nT))$ are selected. The polynomial equations $f_0(x(nT)), \ldots, f_{N-1}(x(nT))$ can be selected as the same polynomial equation except for a different constant term or different polynomial equations. After step 704, step 706 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 708, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. The modulus is selected from the moduli identified in step 706. It should also be appreciated that a different modulus must be selected for each polynomial equation $f_0(x(nT)), \ldots, f_{N-1}(x(nT))$.

As shown in FIG. 7, method 700 continues with step 710. In step 710, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 706 for generating an irreducible form of the respective polynomial equation $f_0(x(nT)), \ldots, f_{N-1}(x(nT))$.

After step 710, method 700 continues with step 712. In step 712, a value for time increment T is selected. Thereafter, an initial value for the variable x of the polynomial equations is selected. The initial value for the variable x can be any value allowable in a residue ring. Notably, the initial value of the variable x defines a sequence starting location. As such, the initial value of the variable x can define a static offset of a chaotic sequence.

Referring again to FIG. 7, method 700 continues with step 716. In step 716, RNS arithmetic operations are used to iteratively determine RNS solutions for each of the stated polynomial equations $f_0(x(nT)), \ldots, f_{N-1}(x(nT))$. In step 718, a series of digits in a weighted number system are determined based in the RNS solutions. Step 718 can involve performing a mixed radix arithmetic operation or a CRT arithmetic operation using the RNS solutions to obtain a chaotic sequence output.

After completing step 718, method 700 continues with a decision step 720. If a chaos generator is not terminated (720:NO), then step 724 is performed where a value of the variable "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 716. Subsequently, method 700 returns to step 716. If the chaos generator is terminated (720:YES), then step 722 is performed where method 700 ends.

Figure 8:
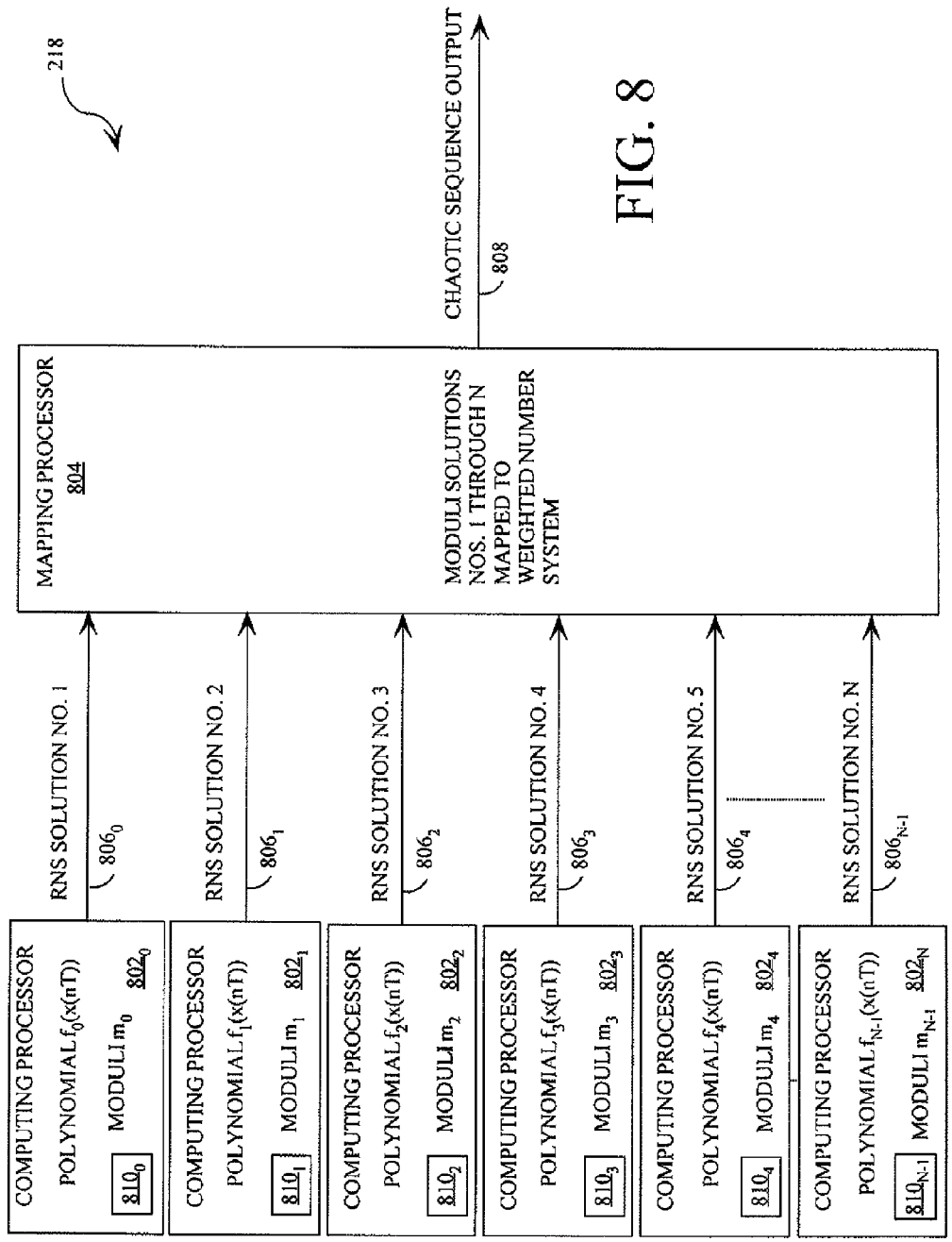
FIG. 8 is a block diagram of a chaos generator shown in FIG. 3 according to an embodiment of the invention.

Referring now to FIG. 8, there is illustrated one embodiment of the chaos generator 218 shown in FIG. 2. Chaos generators 318, 440 are the same as or substantially similar to chaos generator 218. As such, the following discussion of chaos generator 218 is sufficient for understanding chaos generators 318 of FIG. 3 and chaos generators 440 of FIGS. 4-5.

As shown in FIG. 8, chaos generator 218 is generally comprised of hardware and/or software configured to generate a digital chaotic sequence. Accordingly, chaos generator 218 is comprised of computing processors 802$_0$, . . . , 802$_{N-1}$ and a mapping processor 804. Each computing processor 802$_0$, . . . , 802$_{N-1}$ is coupled to the mapping processor 804 by a respective data bus 806$_0$, . . . , 806$_{N-1}$. As such, each computing processor 802$_0$, . . . , 802$_{N-1}$ is configured to communicate data to the mapping processor 804 via a respective data bus 806$_0$, . . . , 806$_{N-1}$. Mapping processor 804 can be coupled to an external device (not shown) via a data bus 808. The external device (not shown) includes, but is not limited to, a communications device configured to combine or modify a signal in accordance with a chaotic sequence output.

Referring again to FIG. 8, the computing processors 802$_0$, . . . , 802$_{N-1}$ are comprised of hardware and/or software configured to solve the polynomial equations $f_0(x(nT))$, . . . , $f_{N-1}(x(nT))$ to obtain a plurality of solutions. The polynomial equations $f_0(x(nT))$, . . . , $f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT))$, . . . , $f_{N-1}(x(nT))$ can also be identical exclusive of a constant value. The constant value can be selected so that a polynomial equation $f_0(x(nT))$, . . . , $f_{N-1}(x(nT))$ is irreducible for a predefined modulus. The polynomial equations $f_0(x(nT))$, . . . , $f_{N-1}(x(nT))$ can further be selected as a constant or varying function of time.

Each of the solutions can be expressed as a unique residue number system (RNS) N-tuple representation. In this regard, it should be appreciated that the computing processors 802$_0$, . . . , 802$_{N-1}$ employ modulo operations to calculate a respective solution for each polynomial equation $f_0(x(nT))$, . . . , $f_{N-1}(x(nT))$ using modulo based arithmetic operations. Each of the computing processors 802$_0$, . . . , 802$_{N-1}$ is comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors 802$_0$, . . . , 802$_{N-1}$ are also comprised of hardware and/or software configured to utilize modulus $m_0, m_1, \ldots, m_{N-1}$ selected for each polynomial equation $f_0(x(nT))$, . . . , $f_{N-1}(x(nT))$ so that each polynomial equation $f_0(x(nT))$, . . . , $f_{N-1}(x(nT))$ is irreducible. The computing processors 802$_0$, . . . , 802$_{N-1}$ are further comprised of hardware and/or software configured to utilize moduli $m_0, m_1, \ldots, m_{N-1}$ selected for each polynomial equation $f_0(x(nT))$, . . . , $f_{N-1}(x(nT))$ so that solutions iteratively computed via a feedback mechanism 810$_0$, . . . , 810$_{N-1}$ are chaotic. In this regard, it should be appreciated that the feedback mechanisms 810$_0$, . . . , 810$_{N-1}$ are provided so that the solutions for each polynomial equation $f_0(x(nT))$, . . . , $f_{N-1}(x(nT))$ can be iteratively computed. Accordingly, the feedback mechanisms 810$_0$, . . . , 810$_{N-1}$ are comprised of hardware and/or software configured to selectively define variables "x" of a polynomial equation as a solution computed in a previous iteration.

Referring again to FIG. 8, the computing processors 802$_0$, . . . , 802$_{N-1}$ are further comprised of hardware and/or software configured to express each of the RNS residue values in a binary number system representation. In this regard, the computing processors 802$_0$, . . . , 802$_{N-1}$ can employ an RNS-to-binary conversion method. Such RNS-to-binary conversion methods are generally known to persons having ordinary skill in the art, and therefore will not be described herein. However, it should be appreciated that any such RNS-to-binary conversion method can be used without limitation. It should also be appreciated that the residue values expressed in binary number system representations are hereinafter referred to as moduli solutions No. 1, . . . , No. N comprising the elements of an RNS N-tuple.

According to an embodiment of the invention, the computing processors 802$_0$, . . . , 802$_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. The table address is used to initiate the chaotic sequence at the start of an iteration. The invention is not limited in this regard.

Referring again to FIG. 8, mapping processor 804 is comprised of hardware and/or software configured to map the moduli (RNS N-tuple) solutions No. 1, . . . , No. N to a weighted number system representation. The result is a series of digits in the weighted number system based on the moduli solutions No. 1, . . . , No. N. For example, the mapping processor 804 can be comprised of hardware and/or software configured to determine the series of digits in the weighted number system based on the RNS residue values using a Chinese Remainder Theorem process. In this regard, it will be appreciated by those having ordinary skill in the art that the mapping processor 1104 is comprised of hardware and/or software configured to identify a number in the weighted number system that is defined by the moduli solutions No. 1, . . . , No. N.

According to an aspect of the invention, the mapping processor 804 can be comprised of hardware and/or software configured to identify a truncated portion of a number in the weighted number system that is defined by the moduli solutions No. 1, . . . , No. N. For example, mapping processor 804 can be comprised of hardware and/or software configured to select the truncated portion to include any serially arranged set of digits of the number in the weighted number system. Mapping processor 804 can also include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. The invention is not limited in this regard.

Referring again to FIG. 8, mapping processor 804 is comprised of hardware and/or software configured to express a chaotic sequence in a binary number system representation. In this regard, it should be appreciated that the mapping processor 804 can employ a weighted-to-binary conversion method. Weighted-to-binary conversion methods are generally known to persons having ordinary skill in the art, and therefore will not be described herein. However, it should be appreciated that any such weighted-to-binary conversion method can be used without limitation.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A method for selectively controlling access to multiple data streams which are communicated using a shared frequency spectrum and a shared spreading code, comprising the steps of:
forming a global data communication signal by amplitude modulating a global data signal comprising global data symbols;
forming a phase modulated signal by phase modulating a data signal including protected data symbols;
forming a protected data communication signal by changing phase angles of said protected data symbols by a variable angle Ø and combining said phase modulated signal with a spreading sequence;
combining said global data communication signal and said protected data communication signal to form an output communication signal which has a spread spectrum format, which concurrently includes both said global data communication signal and said protected data communication signal, and is arranged to permit access to the global data symbols by all authorized users of said output communication signal, and to control access to the protected data symbols so that said protected data symbols are accessible to less than all of said authorized users; and
transmitting said output communication signal over a communications channel.

2. The method according to claim 1, further comprising the step of generating said global data communication signal using discrete time baseband modulation to form amplitude modulated symbols.

3. The method according to claim 1, further comprising the step of generating said protected data communication signal using discrete time baseband modulation to form phase modulated symbols.

4. The method according to claim 1, further comprising the step of generating a random number sequence.

5. The method according to claim 4, wherein the random number sequence is a pseudorandom number sequence or a digitally generated chaotic sequence.

6. The method according to claim 4, further comprising using a random number of said random number sequence to select said variable angle Ø.

7. The method according to claim 6, further comprising the step of using different random numbers of said random number sequence to select said variable angle Ø for changing said phase angles of said protected data symbols.

8. The method according to claim 6, further comprising the step of using at least one random number of said random number sequence for changing a phase angle of at least one protected data symbol of said protected data symbols.

9. The method according to claim 1, further comprising the step of selecting said spreading sequence to be a chaotic spreading sequence.

10. The method according to claim 9, wherein said chaotic spreading sequence has a non-Gaussian statistical amplitude characteristic.

11. A method for selectively controlling access to multiple data streams which are communicated using a shared frequency spectrum and a shared spreading code, comprising the steps of:
forming a global data communication signal by amplitude modulating a global data signal comprising global data symbols;
forming a phase modulated signal by phase modulating a data signal including protected data symbols;
forming a protected data communication signal by changing phase angles of said protected data symbols by a variable angle Ø and combining said phase modulated signal with a spreading sequence;
combining said global data communication signal and said protected data communication signal to form an output communication signal having a spread spectrum format;
transmitting said output communication signal over a communications channel;
receiving said output communication signal at a partial permission receiver;
generating a de-spreading sequence which is identical to said spreading sequence used to construct said output communication signal, said de-spreading sequence being synchronized in time and frequency with said spreading sequence;
correlating said output communication signal with said de-spreading sequence to form a correlated signal; and
amplitude demodulating said correlated signal to recover said global data symbols.

12. The method according to claim 1, further comprising the steps of:
receiving said output communication signal at a full permission receiver;
generating a de-spreading sequence which is identical to said chaotic spreading sequence used to construct said output communication signal, said de-spreading sequence being synchronized in time and frequency with said spreading sequence;
correlating said output communication signal with said de-spreading sequence to obtain a correlated signal comprising a plurality of data symbols;
changing phase angles of said plurality of data symbols using said variable angle Ø to form a phase de-rotated signal; and
phase demodulating said phase de-rotated signal to obtain said protected data symbols.

13. The method according to claim 12, further comprising the step of amplitude demodulating said phase de-rotated signal to obtain said global data symbols.

14. The method according to claim 1, further comprising the steps of:
receiving said output communication signal at a full permission receiver, said output communications signal comprising a plurality of data symbols;
changing phase angles of said plurality of data symbols using said variable angle Ø to form a phase de-rotated signal;
generating a de-spreading sequence which is identical to said spreading sequence used to construct said output communication signal, said de-spreading sequence being synchronized in time and frequency with said spreading sequence;
correlating said phase de-rotated signal with said de-spreading sequence to obtain a correlated signal; and
phase demodulating said correlated signal to obtain said protected data symbols.

15. The method according to claim 14, further comprising the step of amplitude demodulating said phase de-rotated signal to obtain said global data symbols.

16. A communication system configured for selectively controlling access to multiple data streams which are communicated using a shared frequency spectrum, comprising:

an amplitude modulator configured for forming a global data communication signal by amplitude modulating a global data signal comprising global data symbols;
a phase modulator configured for forming a phase modulated signal by phase modulating a data signal including protected data symbols;
a phase rotating and signal combining (PRSC) device configured for forming a protected data communication signal by changing phase angles of said plurality of protected data symbols using a variable angle Ø and combining said phase modulated signal with a spreading sequence;
a second combiner configured for combining said global data communication signal and said protected data communication signal to form an output communication signal which has a spread spectrum format and which concurrently includes both said global data communication signal and said protected data communication signal; and
a transceiver configured for transmitting said output communication signal over a communications channel, wherein said output communication signal configured to permit access to the global data symbols by all authorized users of said output communication signal, and to control access to the protected data symbols whereby said protected data symbols are accessible to less than all of said authorized users.

17. The communication system according to claim 16, wherein said amplitude modulator is further configured for generating said global data communications signal using discrete time baseband modulation to form amplitude modulated symbols.

18. The communication system according to claim 16, wherein said phase modulator is further configured for generating said protected data signal using discrete time baseband modulation to form phase modulated symbols.

19. The communication system according to claim 16, further comprising a random number sequence generator configured for generating a random number sequence.

20. The communication system according to claim 19, wherein said random number sequence is a pseudorandom number sequence or a digitally generated chaotic sequence.

21. The communication system according to claim 19, wherein said PRSC device is further configured for using a random number of said random number sequence to select said variable angle Ø.

22. The communication system according to claim 21, wherein said PRSC device is further configured for using different random numbers of said random number sequence for changing said phase angles of said protected data symbols.

23. The communication system according to claim 21, wherein said PRSC device is further configured for using at least one random number of said random number sequence for changing a phase angle of at least one protected data symbol of said protected data symbols.

24. A communication system configured for selectively controlling access to multiple data streams which are communicated using a shared frequency spectrum, comprising:
an amplitude modulator configured for forming a global data communication signal by amplitude modulating a global data signal comprising global data symbols;
a phase modulator configured for forming a phase modulated signal by phase modulating a data signal including protected data symbols;
a phase rotating and signal combining (PRSC) device configured for forming a protected data communication signal by changing phase angles of said plurality of protected data symbols using a variable angle Ø and combining said phase modulated signal with a spreading sequence;
a second combiner configured for combining said global data communication signal and said protected data communication signal to form an output communication signal having a spread spectrum format; and
a transceiver configured for transmitting said output communication signal over a communications channel; and
at least one partial permission receiver configured for
receiving said output communication signal,
generating a de-spreading sequence which is identical to said spreading sequence used to construct said output communication signal, said de-spreading sequence being synchronized in time and frequency with said spreading sequence,
correlating said output communication signal with said de-spreading sequence to form a correlated signal, and
amplitude demodulating said correlated signal to recover said global data symbols.

25. The communication system according to claim 16, further comprising at least one partial permission receiver configured to perform signal tracking operations on known data symbols.

26. The communication system according to claim 16, further comprising at least one full permission receiver configured for
receiving said output communication signal,
generating a de-spreading sequence which is identical to said spreading sequence used to construct said output communication signal, said de-spreading sequence being synchronized in time and frequency with said spreading sequence,
correlating said output communication signal with said de-spreading sequence to obtain a correlated signal comprising a plurality of data symbols,
changing phase angles of said plurality of data symbols using said variable phase rotating angle to form a phase de-rotated signal, and
phase demodulating said phase de-rotated signal to obtain said protected data symbols.

27. The communication system according to claim 26, wherein said full permission receiver is further configured for amplitude demodulating said phase de-rotated signal to obtain said global data symbols.

28. The communication system according to claim 16, further comprising at least one full permission receiver configured for
receiving said output communication signal comprising a plurality of data symbols,
changing phase angles of said plurality of data symbols using said variable angle Ø to form a phase de-rotated signal,
generating a de-spreading sequence which is identical to said spreading sequence used to construct said output communication signal, said de-spreading sequence being synchronized in time and frequency with said spreading sequence,
correlating said phase de-rotated signal with said de-spreading sequence to obtain a correlated signal,
phase demodulating said correlated signal to obtain said protected data symbols, and amplitude demodulating said phase de-rotated signal to obtain said global data symbols.

* * * * *